US 8,944,208 B2

(12) United States Patent
Kitamura et al.

(10) Patent No.: US 8,944,208 B2
(45) Date of Patent: Feb. 3, 2015

(54) POWER STEERING APPARATUS

(71) Applicant: Hitachi Automotive Systems Steering, Ltd., Hiki-gun, Saitama (JP)

(72) Inventors: Keisuke Kitamura, Atsugi (JP); Satoru Muto, Novi, MI (US); Shogo Ishikawa, Saitama (JP)

(73) Assignee: Hitachi Automotive Systems Steering, Ltd., Hiki-gun, Saitama (JP)

( * ) Notice: Subject to any disclaimer, the term of this patent is extended or adjusted under 35 U.S.C. 154(b) by 0 days.

(21) Appl. No.: 14/186,601

(22) Filed: Feb. 21, 2014

(65) Prior Publication Data

US 2014/0284134 A1 Sep. 25, 2014

(30) Foreign Application Priority Data

Mar. 25, 2013 (JP) ................................. 2013-061961

(51) Int. Cl.
*B62D 5/04* (2006.01)

(52) U.S. Cl.
CPC .................................... *B62D 5/0448* (2013.01)
USPC .......................... 180/444; 180/443; 74/424.82

(58) Field of Classification Search
CPC .......................... F16H 25/2214; B62D 5/0448
USPC ................................ 180/444, 443; 74/424.82
See application file for complete search history.

(56) References Cited

U.S. PATENT DOCUMENTS

| | | | | |
|---|---|---|---|---|
| 6,176,149 B1* | 1/2001 | Misu | ........................... | 74/424.82 |
| 6,286,383 B1* | 9/2001 | Shirai et al. | ................. | 74/424.88 |
| 6,439,338 B2* | 8/2002 | Yoshioka et al. | .............. | 180/444 |
| 6,454,042 B1* | 9/2002 | Yoshida et al. | ................ | 180/444 |
| 6,454,044 B1* | 9/2002 | Menjak et al. | ................. | 180/444 |
| 6,464,034 B1* | 10/2002 | Toda et al. | ..................... | 180/444 |
| 6,561,054 B1* | 5/2003 | Chiu et al. | .................... | 74/424.88 |
| 6,668,672 B2* | 12/2003 | Kuo et al. | .................... | 74/424.82 |
| 6,736,235 B2* | 5/2004 | Yoshida et al. | ................ | 180/444 |
| 6,955,468 B2* | 10/2005 | Yabe et al. | ........................ | 384/45 |
| 7,278,332 B2* | 10/2007 | Nakatani et al. | .............. | 74/89.44 |
| 7,510,045 B2* | 3/2009 | Bareis et al. | ................. | 180/444 |
| 7,516,681 B2* | 4/2009 | Hsu | ........................... | 74/424.86 |
| 7,921,743 B2* | 4/2011 | Ohkubo et al. | ............. | 74/424.87 |
| 8,096,203 B2* | 1/2012 | Chiu et al. | .................... | 74/424.82 |
| 8,544,356 B2* | 10/2013 | Asakura et al. | ............. | 74/424.82 |
| 2002/0003059 A1* | 1/2002 | Yoshioka et al. | .............. | 180/444 |
| 2002/0063014 A1* | 5/2002 | Yoshida et al. | ............... | 180/444 |
| 2007/0006676 A1* | 1/2007 | Mizuhara et al. | ........... | 74/424.86 |

(Continued)

FOREIGN PATENT DOCUMENTS

JP 2006-224938 A 8/2006

*Primary Examiner* — Joseph Rocca
*Assistant Examiner* — Michael Stabley
(74) *Attorney, Agent, or Firm* — Foley & Lardner LLP

(57) ABSTRACT

A flat surface portion is formed on a nut so as to extend to a region where an output pulley attachment portion is formed in an axial direction, and extend substantially in parallel with a tangential direction of a rotational axis of the nut. A ball circulation groove one end side opening, and a ball circulation groove opposite end side opening are formed on the nut. The ball circulation groove one end side opening is in communication with one end of a ball circulation groove and is formed so as to be opened to the flat surface portion in the region where the output pulley attachment portion is formed. The ball circulation groove opposite end side opening is in communication with an opposite end of the ball circulation groove and is formed so as to be opened to the flat surface portion.

18 Claims, 16 Drawing Sheets

(56) References Cited

U.S. PATENT DOCUMENTS

| | | | |
|---|---|---|---|
| 2008/0295630 A1* | 12/2008 | Chen et al. | 74/424.87 |
| 2009/0013811 A1* | 1/2009 | Hsu | 74/424.87 |
| 2010/0170359 A1* | 7/2010 | Chen et al. | 74/424.83 |
| 2010/0206656 A1* | 8/2010 | Asakura et al. | 180/444 |
| 2011/0296939 A1* | 12/2011 | Kaneko et al. | 74/424.87 |
| 2012/0186896 A1* | 7/2012 | Yamamoto et al. | 180/444 |
| 2013/0161114 A1* | 6/2013 | Bando et al. | 180/443 |

* cited by examiner

POWER STEERING APPARATUS

The present invention relates to a power steering apparatus.

Japanese Patent Application Public Disclosure No. 2006-224938 discloses a related technique thereto. Japanese Patent Application Public Disclosure No. 2006-224938 discusses a power steering apparatus including a ball screw mechanism. This power steering apparatus is configured in such a manner that, after reaching one end of a screw groove, balls in the ball screw mechanism return to an opposite end of the screw groove via a circulation passage.

However, the technique discussed in Japanese Patent Application Public Disclosure No. 2006-224938 has such a drawback that the size of the ball screw mechanism increases because a driven gear is disposed adjacent to an axial direction of a nut.

SUMMARY OF INVENTION

The present invention has been conceived in consideration of this drawback, and an object thereof is to provide a power steering apparatus that can realize a size reduction.

To achieve the above-described object, according to a power steering apparatus of the present invention, a flat surface portion is formed on a nut so as to extend to a region where an output pulley attachment portion is formed in the axial direction of the nut, and extend substantially in parallel with a rotational axis of the nut (or extend substantially in parallel with the direction of a line tangent to a circular shape of the nut centered at the rotational axis of the nut). A ball circulation groove one end side opening, and a ball circulation groove opposite end side opening are formed on the nut. The ball circulation groove one end side opening is in communication with one end of a ball circulation groove and is formed so as to be opened to the flat surface portion in the region where the output pulley attachment portion is formed. The ball circulation groove opposite end side opening is in communication with an opposite end of the ball circulation groove and is formed so as to be opened to the flat surface portion.

DESCRIPTION OF EMBODIMENTS

First Embodiment

A power steering apparatus 1 according to a first embodiment will be described now. The power steering apparatus 1 according to the first embodiment is configured in such a manner that an assist force is added to a driver's steering force by transmitting a driving force of an electric motor 40 to a wheel turning shaft 10 via a screw mechanism 26.

Structure of Power Steering Apparatus

Figure 1:
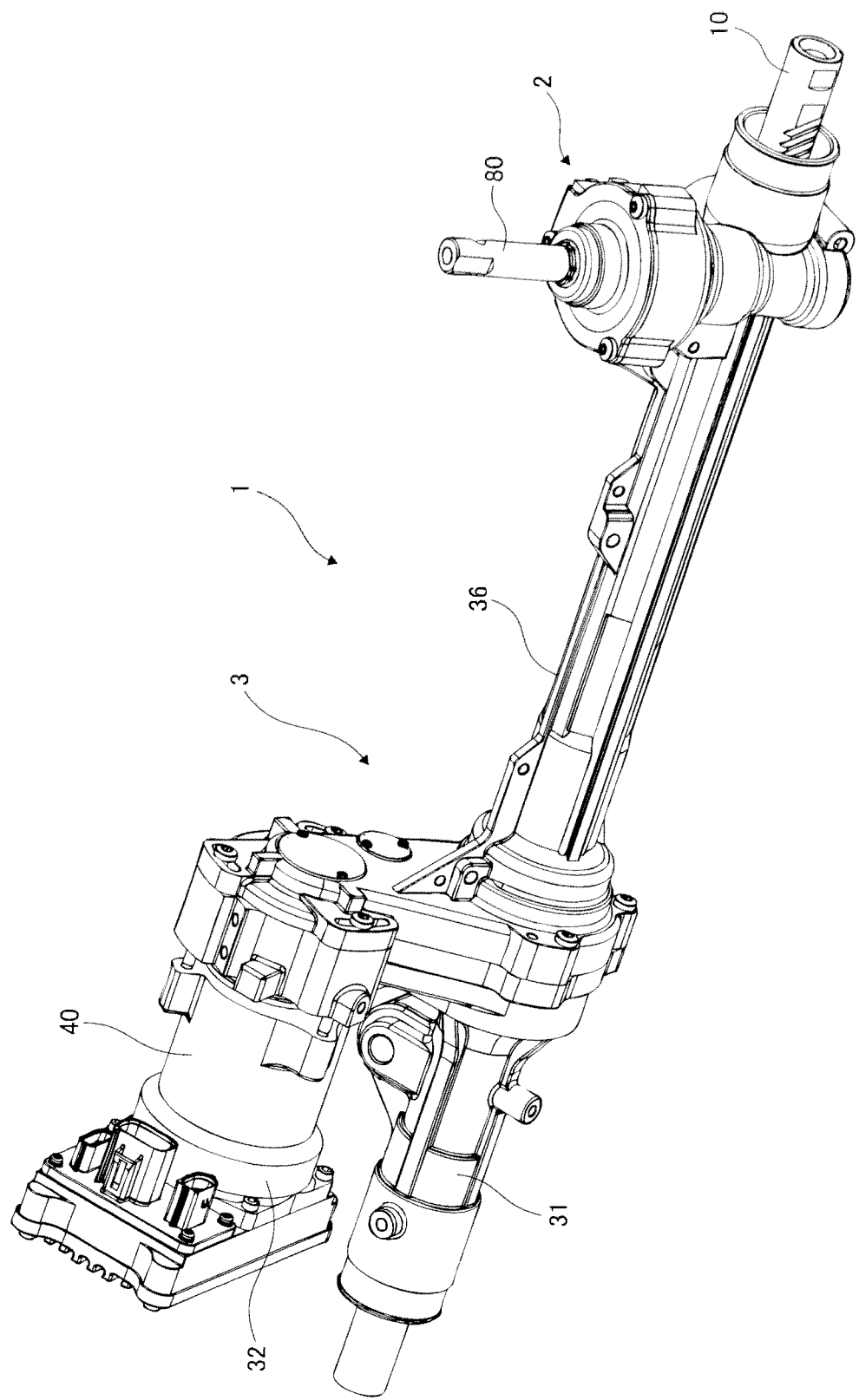
FIG. 1 is a perspective view of a power steering apparatus according to a first embodiment.
Figure 2:
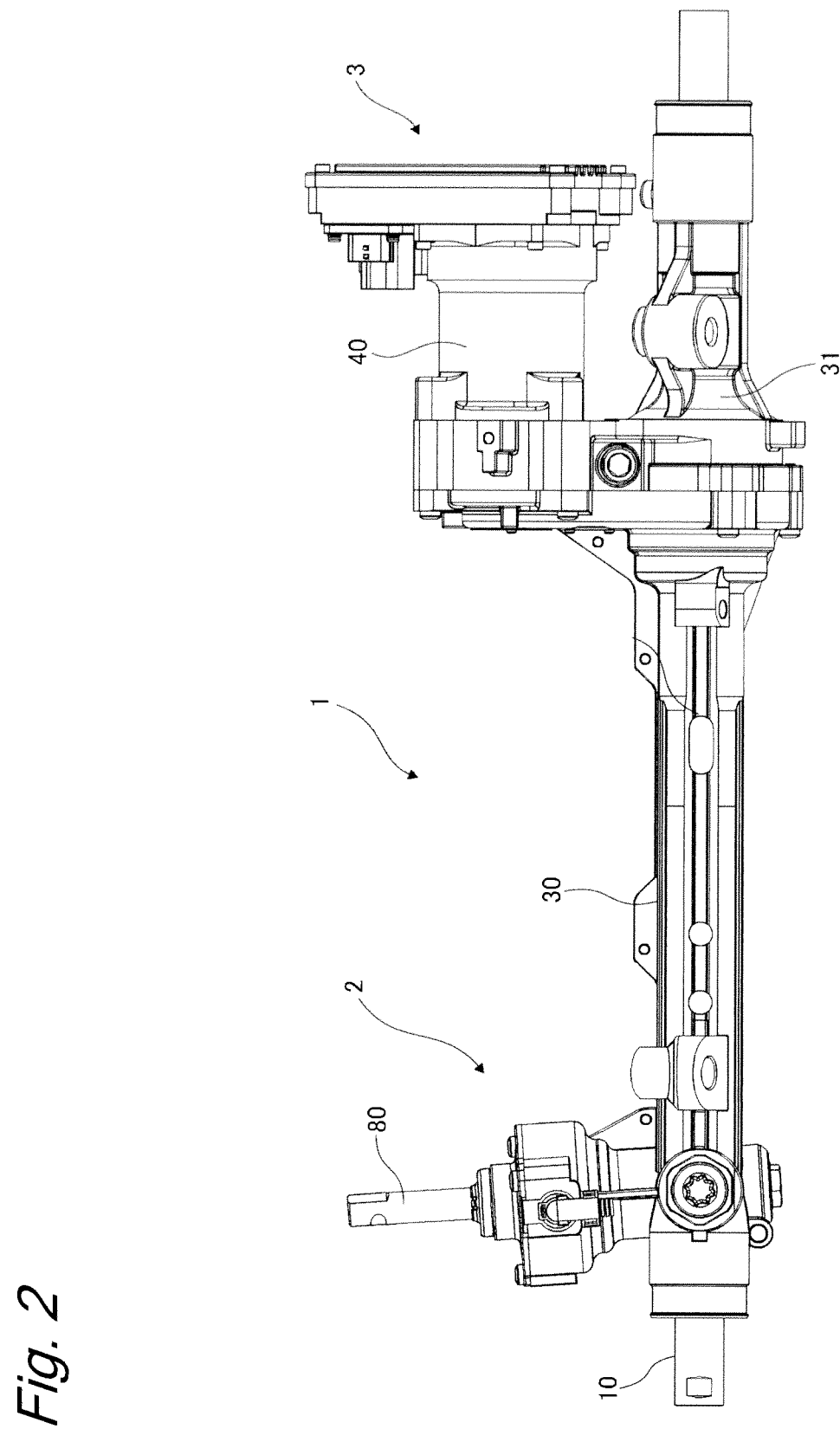
FIG. 2 is a front view of the power steering apparatus according to the first embodiment.
Figure 3:
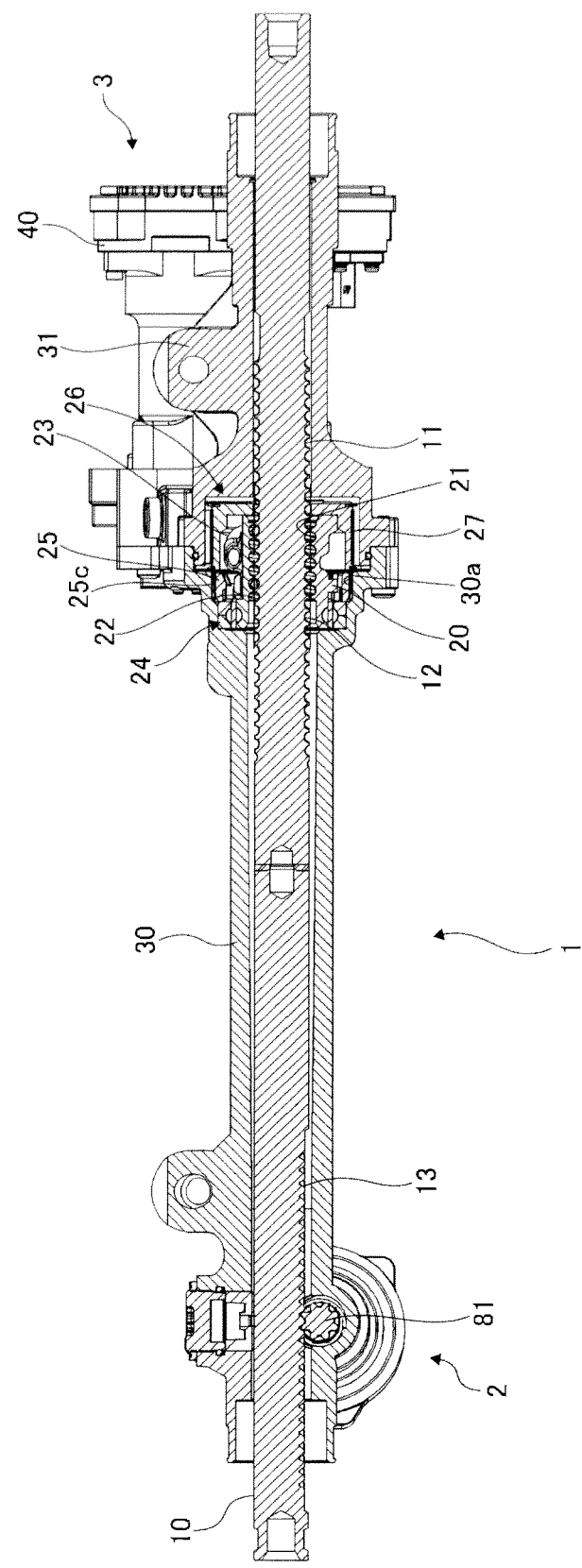
FIG. 3 is a cross-sectional view of the power steering apparatus according to the first embodiment taken along an axial direction.
Figure 4:
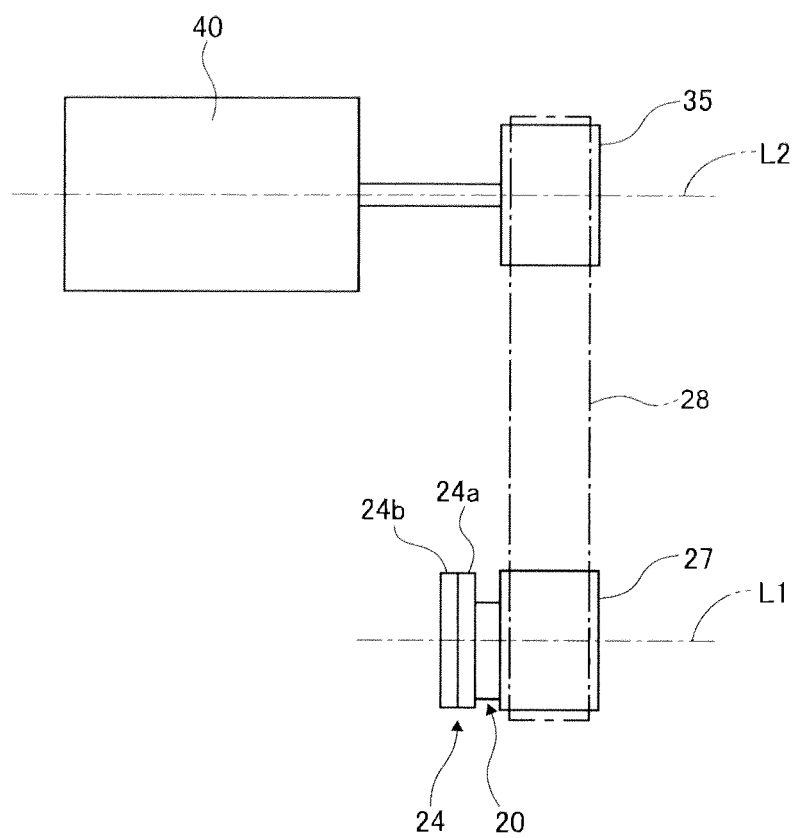
FIG. 4 schematically illustrates how an electric motor and a nut are connected to each other according to the first embodiment.

FIG. 1 is a perspective view of the power steering apparatus 1. FIG. 2 is a front view of the power steering apparatus 1. FIG. 3 is a cross sectional view of the power steering apparatus 1 taken along an axial direction of the wheel turning shaft 10. FIG. 4 schematically illustrates how the electric motor 40 and a nut 20 are connected to each other.

The power steering apparatus 1 includes a steering mechanism 2 that transmits a rotation of a steering wheel operated by a driver to the wheel turning shaft 10 for turning a wheel to be steered, and an assist mechanism 3 that provides an assist force to the wheel turning shaft 10. The steering mechanism 2 includes a steering input shaft 80 coupled to the steering wheel, and a pinion 81 that rotates integrally with the steering input shaft 80. The pinion 81 is meshed with a rack 13 formed along an outer circumference of the wheel turning shaft 10.

The respective components of the power steering apparatus 1 are contained in a housing. The housing includes a first housing 30, a second housing 31, and a third housing 32, and is formed by combining them. The first housing 30 mainly contains the steering mechanism 2, a part of the wheel turning shaft 10, and a part of the screw mechanism 26 of the assist mechanism 3. The second housing 31 mainly contains a part of the screw mechanism 26, and a part of the wheel turning shaft 10. The third housing 32 mainly contains the electric motor 40.

The assist mechanism 3 includes the electric motor 40, and the screw mechanism 26 that transmits an output of the electric motor 40 to the wheel turning shaft 10. The output of the electric motor 40 is controlled by a motor controller (not illustrated) according to a steering torque and a steering amount that the driver inputs to the steering wheel.

The screw mechanism 26 includes the nut 20 and an output pulley 27. The output pulley 27 includes a cylindrical member, and is fixed to the nut 20 so as to be rotatable integrally with the nut 20. A cylindrical input pulley 35 is fixed to a driving shaft of the electric motor 40 so as to be rotatable integrally with the driving shaft. A belt 28 is wound between the output pulley 27 and the input pulley 35. Hereinafter, a rotational axis of the nut 20 and the output pulley 27 is defined as a first reference axis L1, and a rotational axis of the electric motor 40 and the input pulley 35 is defined as a second reference axis L2.

The nut 20 is formed annularly so as to surround the wheel turning shaft 10, and is provided rotatably relative to the wheel turning shaft 10. A groove is spirally formed along an inner circumference of the nut 20, and this groove forms a nut-side ball screw groove 21. A groove is spirally formed along the outer circumference of the wheel turning shaft 10 at a position axially spaced apart from a portion where the above-described rack 13 is formed, and this groove forms a wheel turning shaft-side ball screw groove 11. A ball circulation groove 12 is defined by the nut-side ball screw groove 21 and the wheel turning shaft-side ball screw groove 11 with the wheel turning shaft 10 inserted in the nut 20. A plurality of metallic balls 22 is loaded in the ball circulation groove 12. A rotation of the nut 20 causes movements of the balls 22 in the ball circulation groove 12. As a result, the wheel turning shaft 10 longitudinally moves relative to the nut 20.

Structure of Nut

Figure 5:
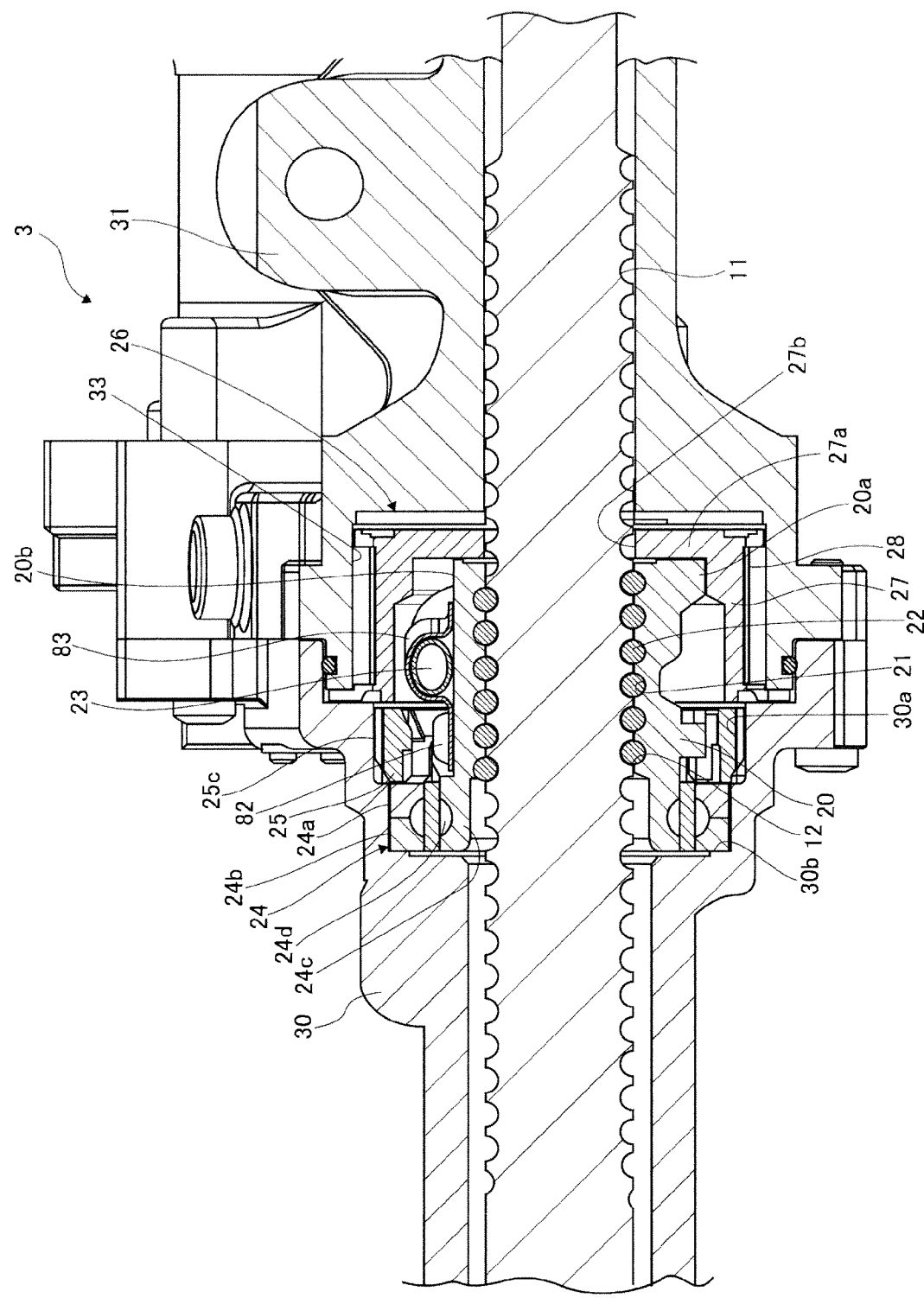
FIG. 5 is a partially enlarged cross-sectional view of the power steering apparatus according to the first embodiment.
Figure 6:
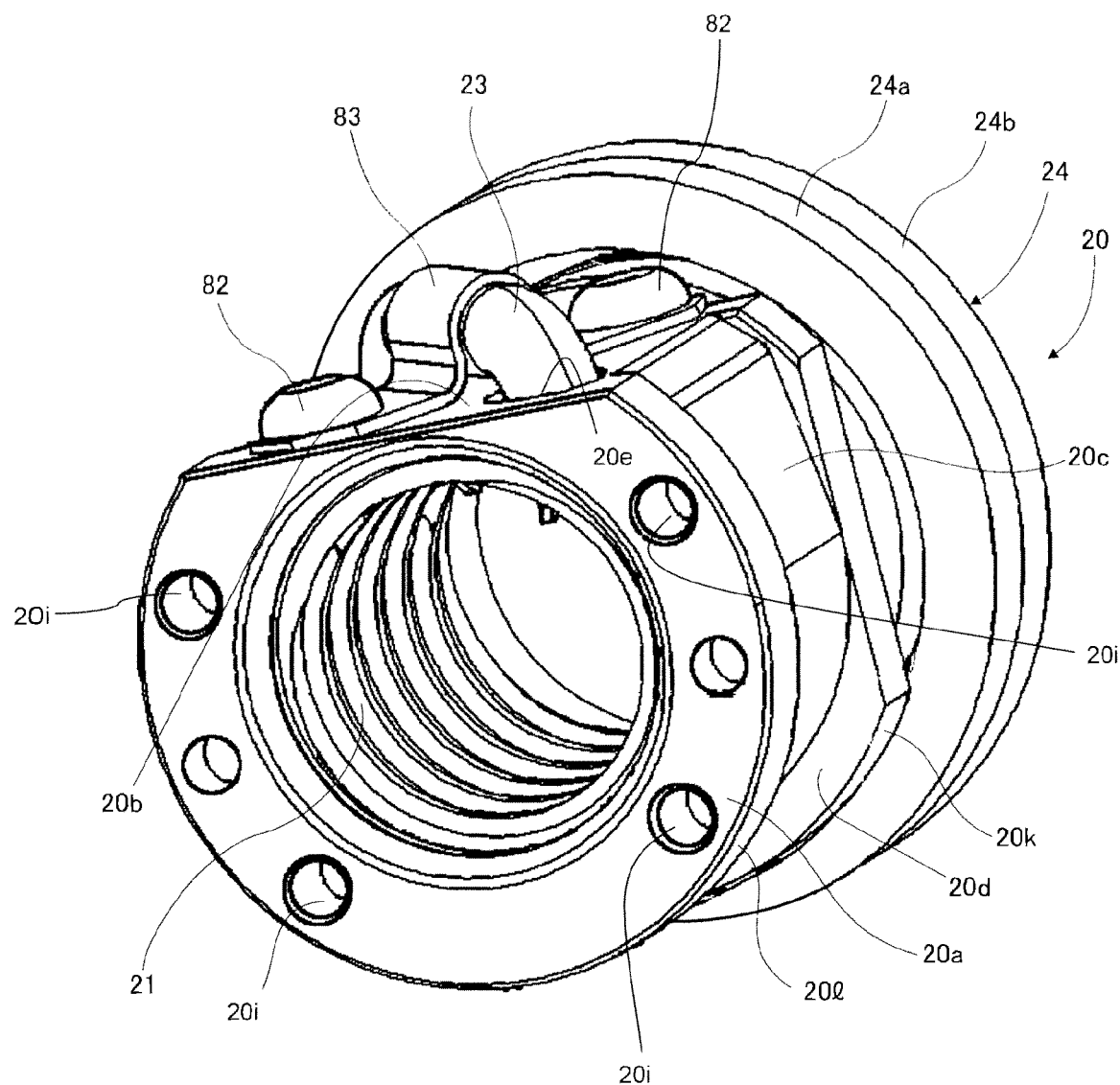
FIG. 6 is a perspective view of the nut according to the first embodiment.
Figure 7:
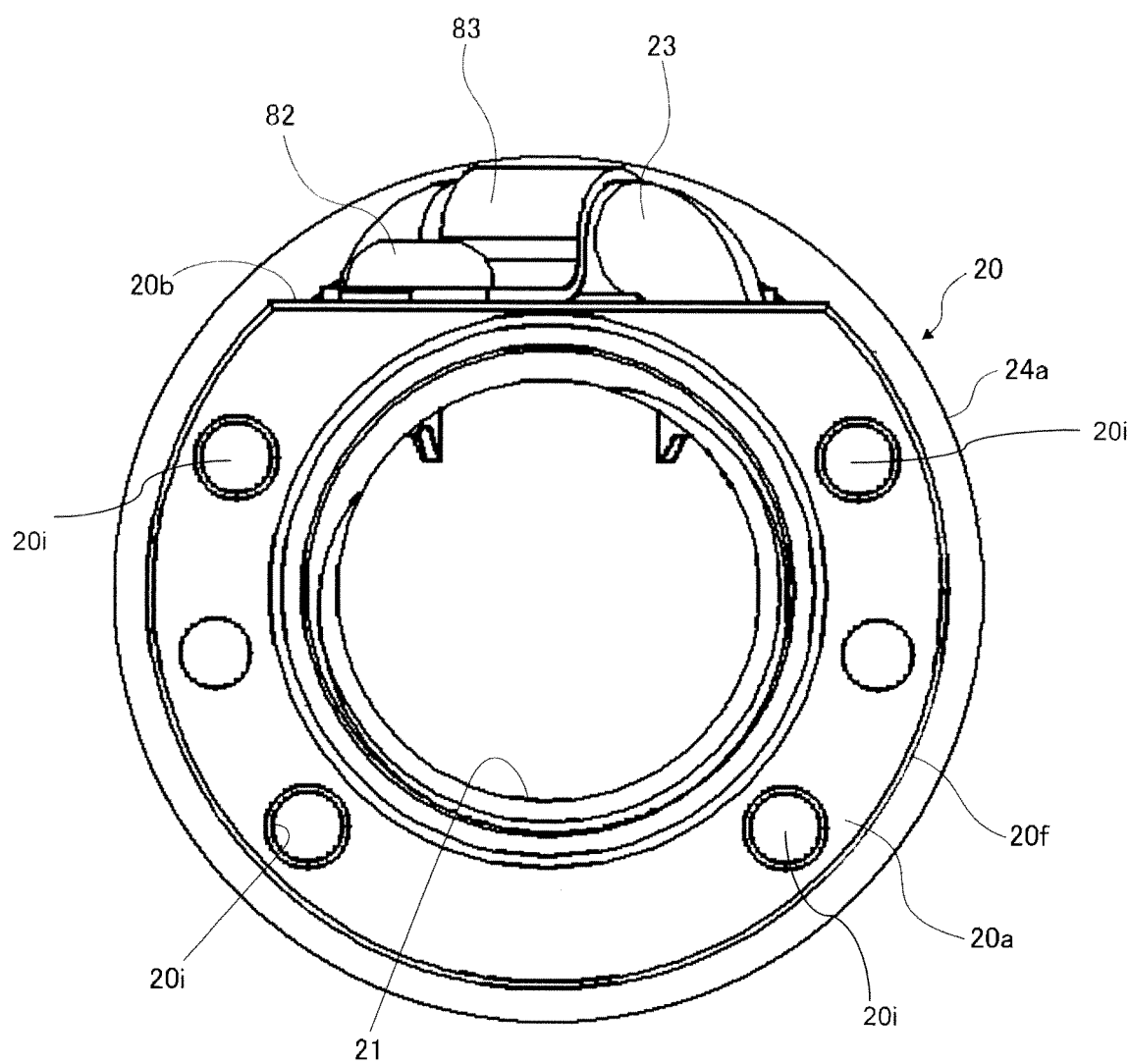
FIG. 7 is a front view of the nut according to the first embodiment.
Figure 8:
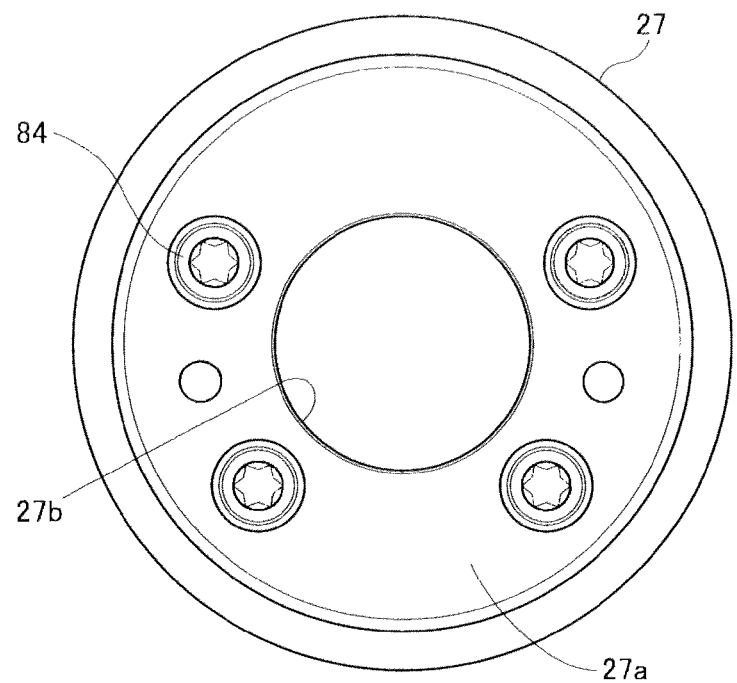
FIG. 8 is a front view of the nut with an output pulley attached thereto according to the first embodiment.
Figure 9:
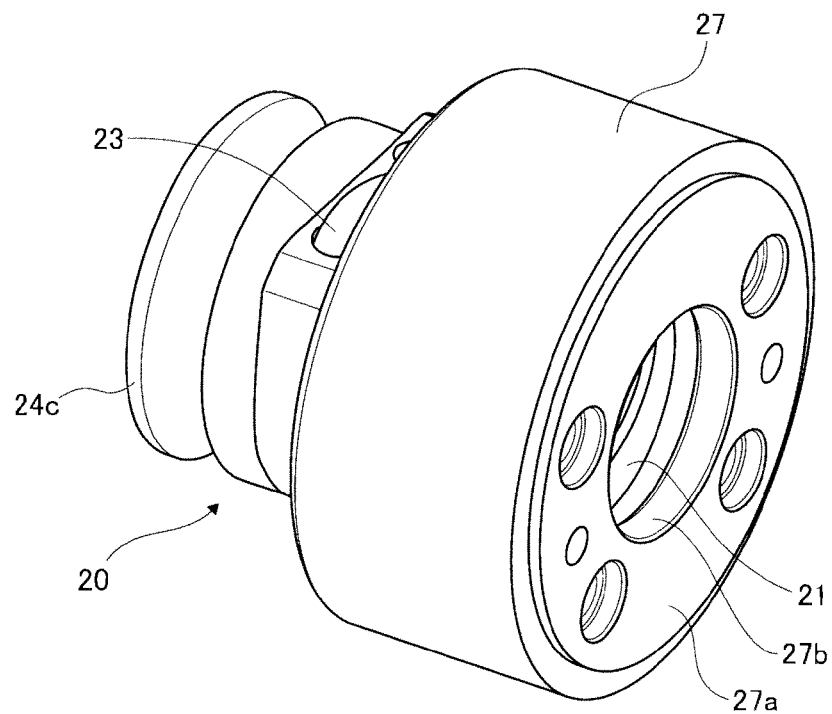
FIG. 9 is a perspective view of the nut with the output pulley attached thereto according to the first embodiment.
Figure 10:
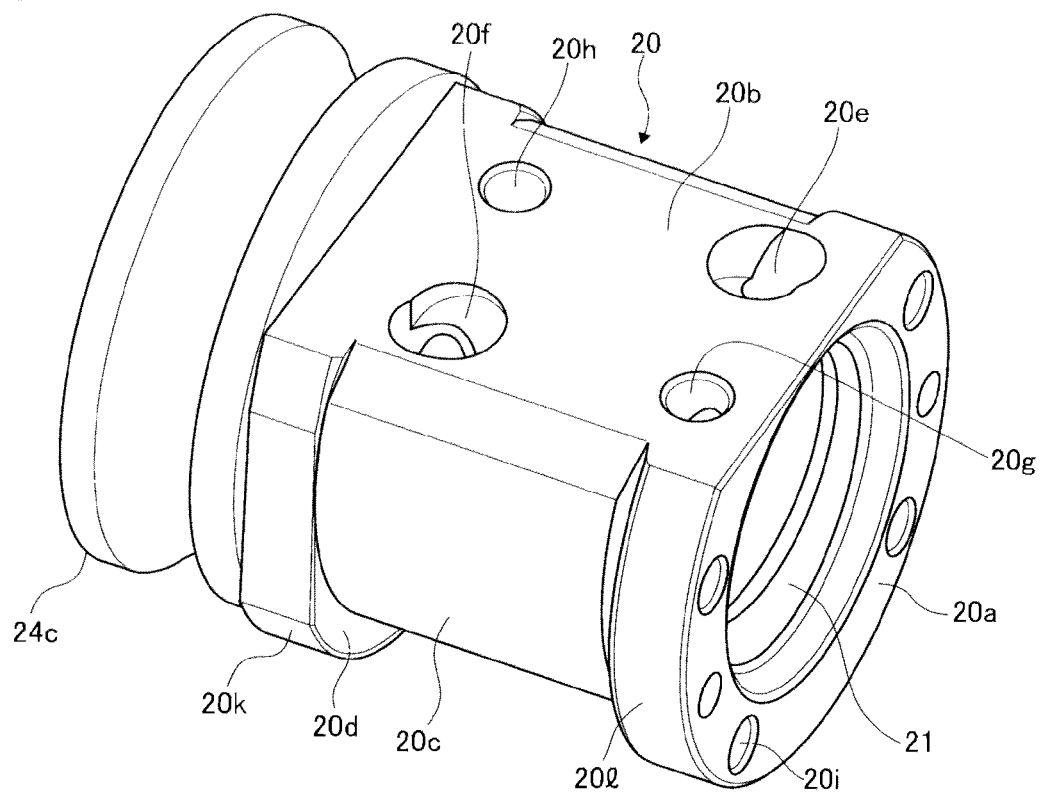
FIG. 10 is a perspective view of the nut with a circulation member removed therefrom according to the first embodiment as viewed from another angle.
Figure 11:
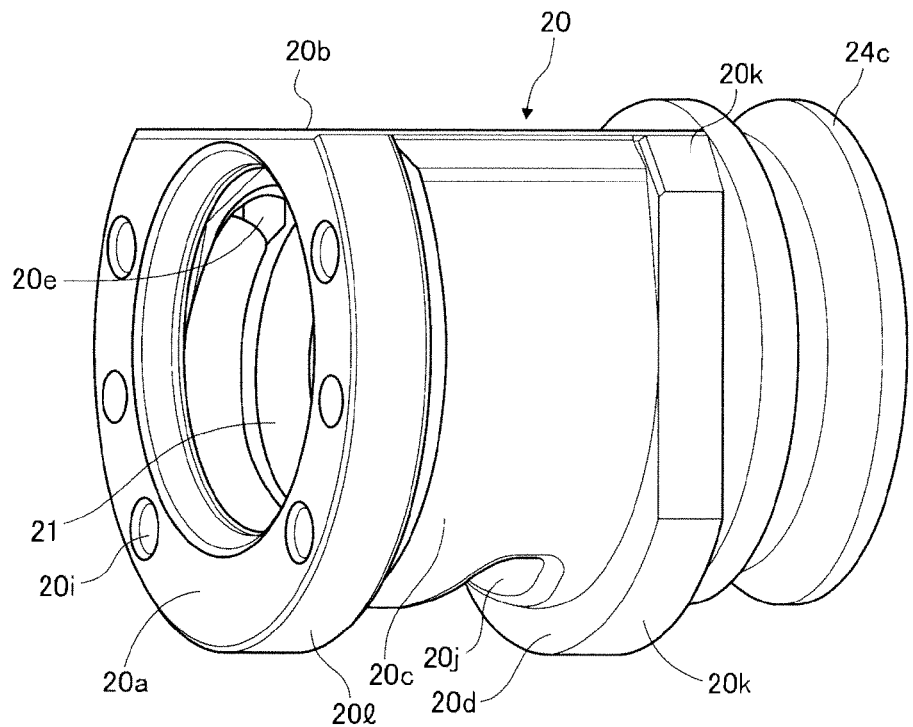
FIG. 11 is a perspective view of the nut with the circulation member removed therefrom according to the first embodiment as viewed from another angle.
Figure 12:
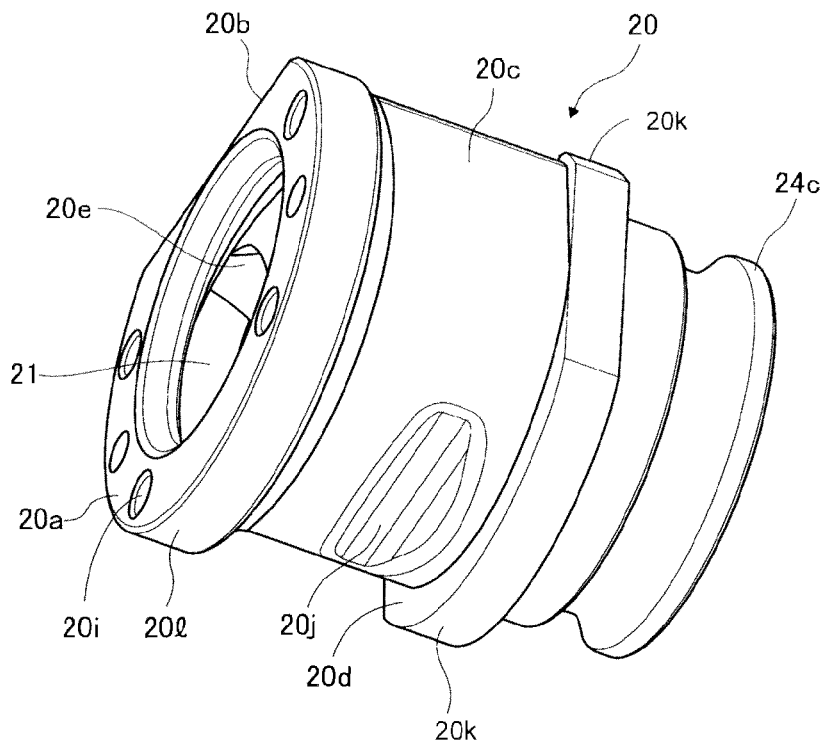
FIG. 12 is a perspective view of the nut with the circulation member removed therefrom according to the first embodiment as viewed from another angle.
Figure 13:
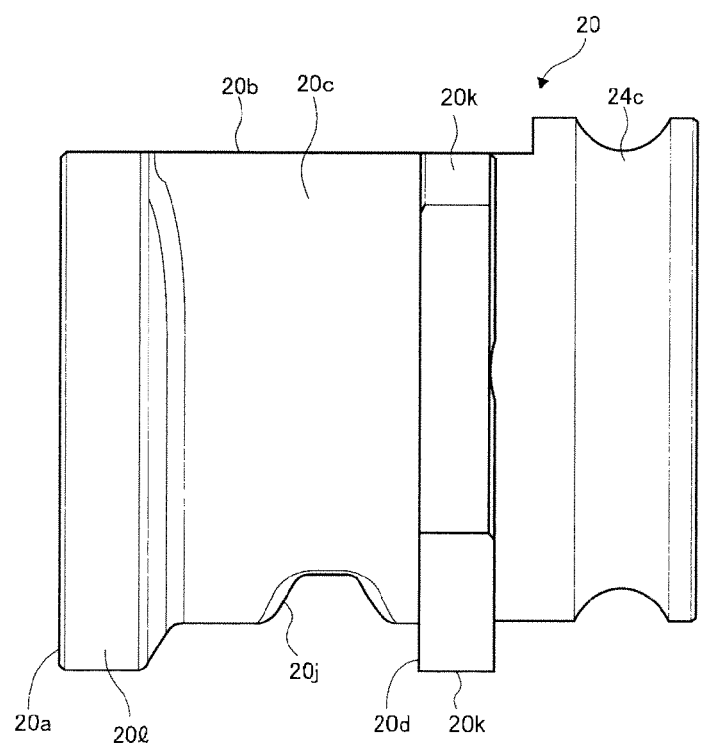
FIG. 13 is a side view of the nut with the circulation member removed therefrom according to the first embodiment.
Figure 14:
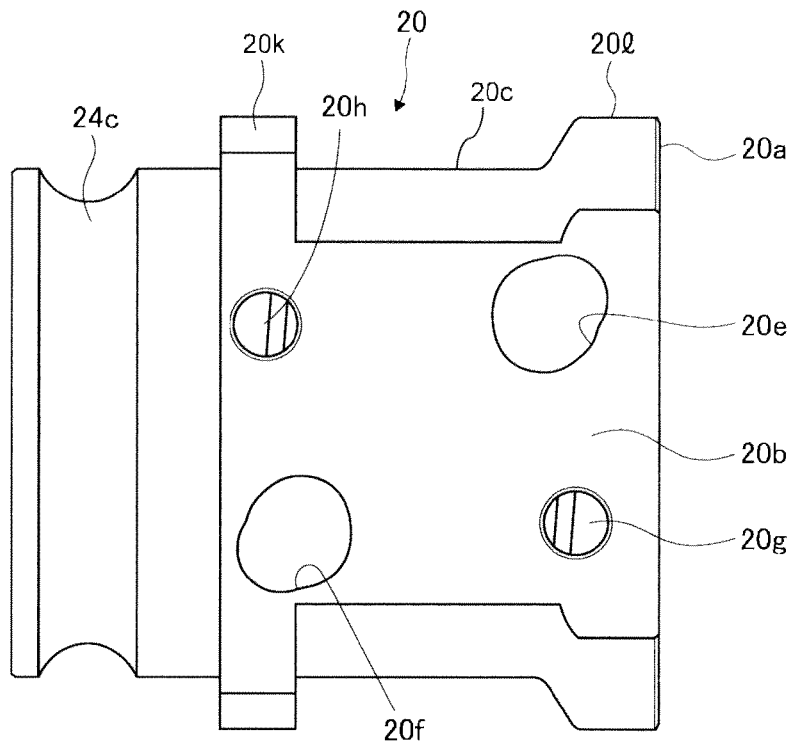
FIG. 14 is a side view of the nut with the circulation member removed therefrom according to the first embodiment as viewed from another angle.
Figure 15:
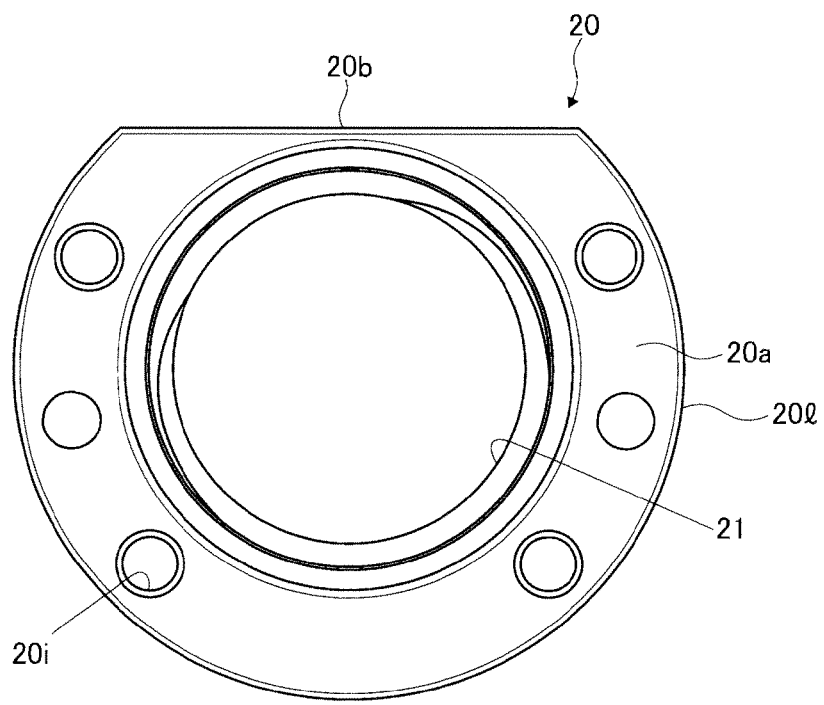
FIG. 15 is a front view of the nut with the circulation member removed therefrom according to the first embodiment.

FIG. 5 is an enlarged cross-sectional view at and around the assist mechanism 3 of the power steering apparatus 1. FIG. 6 is a perspective view of the nut 20 with a circulation member 23 mounted thereon. FIG. 7 is a front view of the nut 20 with the circulation member 23 mounted thereon as viewed from an axial direction. FIG. 8 is a front view of the nut 20 with the output pulley 27 attached thereto as viewed from the axial direction. FIG. 9 is a perspective view of the nut 20 with the output pulley 27 attached thereto. FIG. 10 is a perspective view of the nut 20. FIG. 11 is a perspective view of the nut 20. FIG. 12 is a perspective view of the nut 20. FIG. 13 is a side view of the nut 20 as viewed from a radial direction. FIG. 14 is a side view of the nut 20 as viewed from the radial direction. FIG. 15 is a front view of the nut 20 as viewed from the axial direction.

The nut 20 includes a flat surface portion 20b, a main body portion 20c, an output pulley attachment portion 20a, and a clamping large-diameter portion 20d. The flat surface portion 20b is formed on an outer circumference of the nut 20 as a surface in parallel with the rotational axis of the nut 20. The main body portion 20c is annularly formed so as to surround the wheel turning shaft 10. The output pulley attachment portion 20a is formed at one end side in the axial direction relative to the main body portion 20c. The clamping large-diameter portion 20d is formed at an opposite end side in the axial direction relative to the main body portion 20c.

The flat surface portion 20b is formed into a flat surface in parallel with the rotational axis of the nut 20 by cutting out a part of the substantially cylindrical outer circumferential surface of the nut 20. The flat surface portion 20b is formed across the output pulley attachment portion 20a, the main body portion 20c, and the clamping large-diameter portion 20d.

A ball circulation groove one end side opening 20e in communication with one end of the ball circulation groove 12 is formed on the flat surface portion 20b. The ball circulation groove one end side opening 20e is at least partially opened in a region where the output pulley attachment portion 20a is formed, in a range of the nut 20 in the axial direction. Obviously, the ball circulation groove one end side opening 20e may be wholly opened in the region where the output pulley attachment portion 20a is formed, in the range of the nut 20 in the axial direction.

Further, a ball circulation groove opposite side end side opening 20f in communication with an opposite end of the ball circulation groove 12 is formed on the flat surface portion 20b. The ball circulation groove opposite end side opening 20f is at least partially opened in a region where the clamping large-diameter portion 20d, in the range of the nut 20 in the axial direction. Obviously, the ball circulation groove opposite end side opening 20f may be wholly opened in the region where the clamping large-diameter portion 20d, in the range of the nut 20 in the axial direction.

The ball circulation groove one end side opening 20e and the ball circulation groove opposite end side opening 20f are connected to each other via the tubular circulation member 23. One end of the circulation member 23 is inserted in the ball circulation groove one end side opening 20e, and an opposite end of the circulation member 23 is inserted in the ball circulation groove opposite end side opening 20f.

A one end side female screw portion 20g, and an opposite end side female screw portion 20h are formed on the flat surface portion 20b. The one end side female screw portion 20g is at least partially opened in the region where the output pulley attachment portion 20a is formed, in the range of the nut 20 in the axial direction. Obviously, the one end side female screw portion 20g may be wholly opened in the region where the output pulley attachment portion 20a is formed, in the range of the nut 20 in the axial direction.

The opposite end side female screw portion 20h is at least partially opened in the region where the clamping large-diameter portion 20d is formed. Obviously, the opposite end side female screw portion 20h may be wholly opened in the region where the clamping large-diameter portion 20d is formed.

Figure 16:
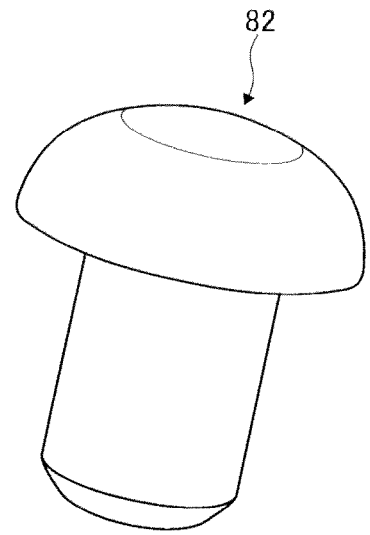
FIG. 16 is a perspective view of a screw according to the first embodiment.

The one end side female screw portion 20g and the opposite end side female screw portion 20h are threaded as female screws. The circulation member 23 is fixed to the nut 20 by a fixation metal 83 formed so as to extend over the circulation member 23. The fixation metal 83 is fixed to the nut 20 by using a pair of screws 82 having a same size. More specifically, the fixation metal 83 is fixed to the nut 20 by threadably engaging one of the screws 82 with the one end side female screw portion 20g, and threadably engaging the other of the screws 82 with the opposite end side female screw portion 20h. FIG. 16 is a perspective view of one of the screws 82. As illustrated in FIG. 16, a head portion of the screw 82 is formed into a substantially semispherical shape.

Figure 17:
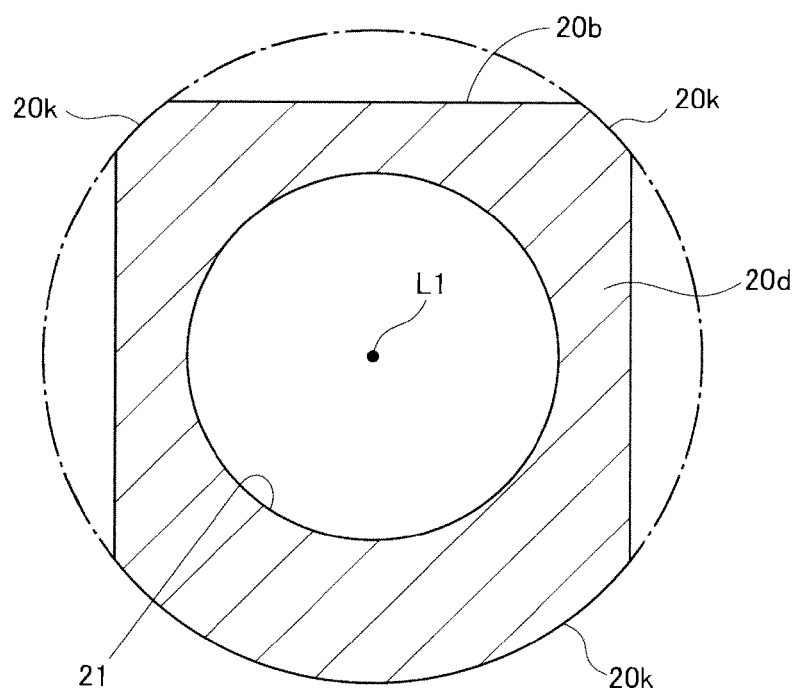
FIG. 17 is a cross-sectional view of a clamping large-diameter portion according to the first embodiment taken along a radial direction.

The clamping large-diameter portion 20d is formed so as to have a larger outer diameter than the outer diameter of the main body portion 20c. FIG. 17 is a cross-sectional view of the clamping large-diameter portion 20d taken along the radial direction. As illustrated in FIG. 17, the clamping large-diameter portion 20d includes an opposite end side clamping portion 20k. The opposite end side clamping portion 20k is formed into an arcuate shape that substantially matches a virtual circle centered at the first reference axis L1 over a predetermined circumferential range.

Figure 18:
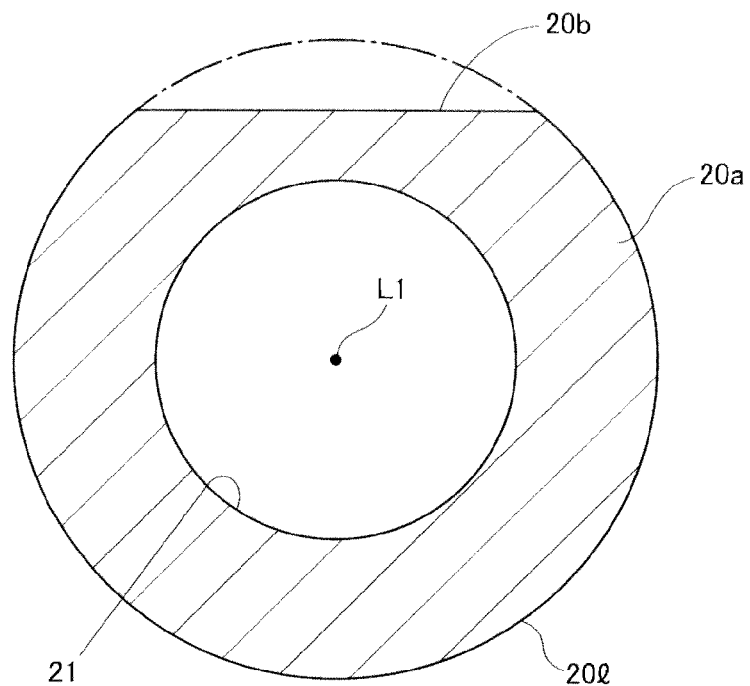
FIG. 18 is a cross-sectional view of an output pulley attachment portion according to the first embodiment taken along the radial direction.

The output pulley attachment portion 20a is formed so as to have a larger outer diameter of the outer diameter of the main body portion 20c. FIG. 18 is a cross-sectional view of the output pulley attachment portion 20a taken along the radial direction. As illustrated in FIG. 18, the output pulley attachment portion 20a is formed into an arcuate shape that substantially matches the virtual circle centered at the first reference axis L1 over a predetermined circumferential range, and includes a one end side clamping portion 20l. The opposite end side clamping portion 20k and the one end side clamping portion 20l are formed to allow the nut 20 to be clamped to a mechanical processing tool for manufacturing the nut 20 (not illustrated).

The output pulley 27 is attached to the output pulley attachment portion 20a. The output pulley 27 includes a cylindrical member, and a bottom portion 27a formed on one side of the cylindrical member. A through-hole 27b, through which the wheel turning shaft 10 is inserted, is formed through the bottom portion 27a. Four bolt holes 20i threaded as female screws are formed on a side surface of the output pulley attachment portion 20a in the axial direction. The output pulley attachment portion 20a is inserted into the output pulley 27 from an opening of the output pulley 27 on an opposite side in such a manner that the bottom portion 27a of the output pulley 27 faces the side surface of the output pulley attachment portion 20a in the axial direction. Then, the output pulley 27 is fastened to the output pulley attachment portion 20a by bolts 84. A part of the circulation member 23 is contained in an inner circumferential side of the output pulley 27 with the output pulley 27 attached to nut 20 (refer to FIG. 9).

A positioning groove 20j is formed at the main body portion 20c of the nut 20 on an opposite side of the first reference axis L1 from the flat surface portion 20b in the radial direction, by recessing a part of the outer circumference (refer to FIG. 11). The positioning groove 20j is used to position the nut 20 when clamping the nut 20 to the mechanical processing tool for manufacturing the nut 20 (not illustrated).

Function

A force applied to the wheel turning shaft 10 should be distributed to the respective balls 22 to secure durability of the screw mechanism 26. To achieve this distribution, a sufficient number of balls 22 should be loaded in the ball circulation groove 12, and therefore the ball circulation groove 12 should have a length long enough to allow the sufficient number of balls 22 to be loaded therein.

Accordingly, first, a length of the nut 20 in the axial direction is determined based on the required length of the ball circulation groove 12. Further, the output pulley 27 and the nut 20 should be connected to each other in such a manner that power is transmitted from the output pulley 27 to the nut 20. Therefore, a portion for an attachment of the output pulley 27 should be formed at the nut 20. However, simply forming the portion for the attachment of the output pulley 27 results in an increase in the length of the nut 20 in the axial direction, leading to an increase in the size of the nut 20.

Therefore, according to the first embodiment, the output pulley attachment portion 20a having a larger outer diameter than the outer diameter of the main body portion 20c is formed on the one end side of the nut 20 relative to the main body portion 20c in the axial direction, and the output pulley 27 is attached to this output pulley attachment portion 20a. Further, the flat surface portion 20b is formed at the nut 20 so as to extend to the region of the output pulley attachment portion 20a, and the ball circulation groove one end side opening 20e is at least partially opened in the region of the flat surface portion 20b where the output pulley attachment portion 20a is formed.

Forming the output pulley attachment portion 20a having a larger outer diameter than the outer diameter of the main body portion 20c at the nut 20 allows the bolt holes 20i for attaching the output pulley 27 to be formed on the side surface of the output pulley attachment portion 20a (refer to FIGS. 6 and 7). In other words, the region for the attachment of the output pulley 27 can be secured at the nut 20 without elongating the nut 20 in the axial direction so that the length of the nut 20 in the axial direction can be reduced. Further, the ball circulation groove one end side opening 20e is at least partially opened in the region of the flat surface portion 20b where the output pulley attachment portion 20a is formed, whereby the ball circulation groove 12 can be formed so as to extend to the region where the output pulley attachment portion 20a is formed so that the length of the nut 20 in the axial direction can be reduced. Further, the ball circulation groove one end side opening 20e is formed on the flat surface portion 20b, which can facilitate a process for forming the ball circulation groove one end side opening 20e and a process for mounting the circulation member 23.

According to the first embodiment, the one end side female screw portion 20g is at least partially opened in the region of the flat surface portion 20b where the output pulley attachment portion 20a is formed (refer to FIG. 14). The one end side female screw portion 20g is opened in the region of the flat surface portion 20b where the output pulley attachment portion 20a is formed so that the length of the nut 20 in the axial direction can be reduced.

Figure 19:
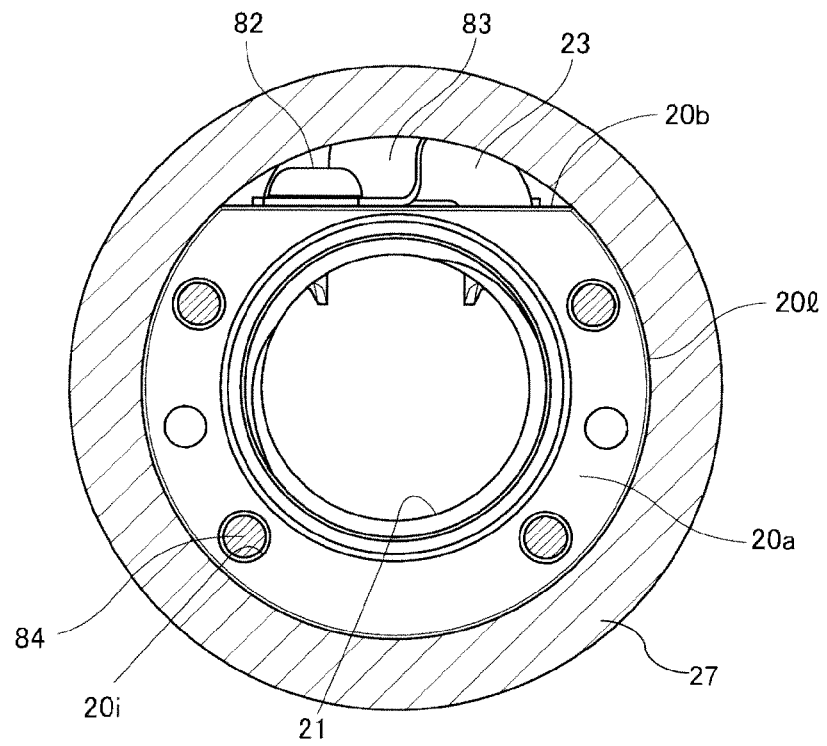
FIG. 19 is a partial cross-sectional view of the nut with the output pulley attached thereto according to the first embodiment.

According to the first embodiment, the head portion of the screw 82 is formed into a substantially semispherical shape. FIG. 19 is a cross sectional view of the output pulley 27 attached to the nut 20 taken along the radial direction. The one end side female screw portion 20g is opened in the region where the output pulley attachment portion 20a is formed. Therefore, the screw 82 inserted in the one end side female screw portion 20g is located between the flat surface portion 20b and the inner circumference of the output pulley 27. Forming the head portion of the screw 82 into a substantially semispherical shape can prevent the head portion of the screw 82 from interfering with the inner circumferential surface of the output pulley 27.

According to the first embodiment, the opposite end side clamping portion 20k is formed at the clamping large-diameter portion 20d, and this opposite end side clamping portion 20k has an arcuate shape that substantially matches the virtual circle centered at the first reference axis L1. Further, the flat surface portion 20b is formed so as to extend to the region where the clamping large-diameter portion 20d is formed (the region where the opposite end side clamping portion 20k is formed) in the axial direction, and the ball circulation groove opposite end side opening 20f is at least partially opened in the region of the flat surface portion 20b where the opposite end side clamping portion 20k is formed (refer to FIG. 14).

The opposite end side clamping portion 20k is formed into an arcuate shape that substantially matches the virtual circle centered at the first reference axis L1, which allows the nut 20 to be clamped to the mechanical processing tool for manufacturing the nut 20 (not illustrate) with the first reference axis L1 set as the rotational axis.

Further, the ball circulation groove opposite end side opening 20f is opened in the region of the flat surface portion 20b where the opposite end side clamping portion 20k is formed, whereby the ball circulation groove 12 can be formed so as to extend to the region where the opposite end side clamping portion 20k is formed so that the length of the nut 20 in the axial direction can be reduced. Further, the ball circulation groove opposite end side opening 20f is formed on the flat surface portion 20b, which can facilitate a process for forming the ball circulation groove opposite end side opening 20f and the process for mounting the circulation member 23.

According to the first exemplary embodiment, the one end side clamping portion 20l is formed at the output pulley attachment portion 20a, and this one end side clamping portion 20l has an arcuate shape that substantially matches the virtual circle centered at the first reference axis L1. The opposite end side clamping portion 20k and the one end side clamping portion 20l serve as a pair of clamping portion having a same central axis, thereby facilitating a clamping process for clamping the nut 20 in an unprocessed state to the mechanical processing tool (not illustrated).

According to the first embodiment, the positioning groove 20j is formed on the opposite side of the first reference axis L1 of the nut 20 from the flat surface portion 20b in the radial direction (refer to FIGS. 11 to 13). The provision of the positioning groove 20j can improve the accuracy of positioning the nut 20 when clamping the nut 20 to the mechanical processing tool (not illustrated).

Advantageous Effect

The first embodiment provides the following effects.

The power steering apparatus according to the first embodiment comprises:

the wheel turning shaft (rack) 10 configured to turn the wheel to be steered by axially moving according to a rotation of the steering wheel;

the wheel turning shaft side ball screw groove 11 formed on the outer circumferential side of the wheel turning shaft 10, and shaped into a spiral groove;

the nut 20 having the main body portion 20c annularly formed so as to surround the wheel turning shaft 10, and provided rotatably relative to the wheel turning shaft 10;

the nut side ball screw groove 21 formed on the inner circumferential side of the nut 20, shaped into a spiral groove, and forming the ball circulation groove 12 together with the wheel turning shaft side ball screw groove 11;

the plurality of balls 22 loaded in the ball circulation groove 12;

the output pulley attachment portion 20a formed on the one end side in the axial direction relative to the main body portion 20c, assuming that the axial direction is the direction along the rotational axis of the nut 20, and formed so as to have a larger diameter than the outer diameter of the main body portion 20c;

the output pulley 27 attached to the output pulley attachment portion 20a so as to face the one end side of the nut 20 in the axial direction, and formed into a cylindrical shape so as to surround the wheel turning shaft 10;

the cylindrically formed input pulley 35 having the rotational axis located offset from the rotational axis of the nut 20 in the radial direction, in which the rotational axis of the nut 20 is defined as the first reference axis and the rotational axis of the input pulley 35 is defined as the second reference axis;

the belt 28 (a transmission member) provided so as to extend over the output pulley 27 and the input pulley 35, and configured to transmit a rotation of the input pulley 35 to the output pulley 27;

the electric motor 40 configured to rotationally drive the nut 20 via the belt 28 and the output pulley 27 by rotationally driving the input pulley 35, and provide a steering force to the wheel turning shaft 10 through conversion of the rotation of the nut 20 into an axial motion of the wheel turning shaft 10;

the flat surface portion 20b formed on the outer side of the nut 20 in the radial direction over the predetermined range in the circumferential direction, assuming that the radial direction is the radial direction of the first reference axis L1 and the circumferential direction is the circumferential direction of the first reference axis L1, and formed so as to extend to the region where the output pulley attachment portion 20a is formed in the axial direction of the nut 20 and extend substantially in parallel with the first reference axis L1 (or extend substantially in parallel with the direction of a line tangent to the circular shape of the nut 20 centered at the first reference axis L1);

the ball circulation groove one end side opening 20e (a ball circulation groove one end side opening) provided in communication with the one end of the ball circulation groove 12, and formed so as to be at least partially opened to the flat surface portion 20b in the region where the output pulley attachment portion 20a is formed in the range of the nut in the axial direction;

the ball circulation groove opposite end side opening 20f (a ball circulation groove opposite end side opening) provided in communication with the opposite end of the ball circulation groove 12, and formed so as to be opened to the flat surface portion 20b; and the circulation member 23 connecting the one end side and the opposite end side of the ball circulation groove 12 so that the plurality of balls 22 can circulate from the one end side to the opposite end side of the ball circulation groove 12 or the opposite end side from the one end side of the ball circulation groove 12.

Therefore, a region for the attachment of the output pulley 27 can be secured without elongating the nut 20 in the axial direction so that the length of the nut 20 in the axial direction can be reduced. Further, the ball circulation groove one end side opening 20e is opened in the region of the flat surface portion 20b where the output pulley attachment portion 20a is formed, whereby the ball circulation groove 12 can be formed so as to extend to the region where the output pulley attachment portion 20a is formed so that the length of the nut 20 in the axial direction can be reduced. Further, the ball circulation groove one end side opening 20e is formed on the flat surface portion 20b, which can facilitate the process for forming the ball circulation groove one end side opening 20e and the process for mounting the circulation member 23.

(2) The above-described power steering apparatus includes the fixation metal 83 (a fixation member) that fixes the circulation member 23 to the nut 20 by being coupled to the nut 20 by the screws 82. The nut 20 includes the one end side female screw portion 20g and the opposite end side female screw portion 20h (a female screw portion). The one end side female screw portion 20g and the opposite end side female screw portion 20h are formed so as to be opened to the flat surface portion 20, and include the female screws that are threadably engaged with the screws 82, respectively. At least a part of the one end side female screw portion 20g is formed in the region of the flat surface portion 20b where the output pulley attachment portion 20a is formed in the axial direction in the range of the nut 20 in the axial direction.

The one end side female screw portion 20g is opened in the region of the flat surface portion 20b where the output pulley attachment portion 20a is formed, so that the length of the nut 20 in the axial direction can be reduced.

(3) The head portion of the screws 82 has a substantially semispherical shape.

The substantially semispherical head portion of the screw 82 can prevent the head portion of the screw 82 from interfering with the inner circumferential surface of the output pulley 27.

(4) The nut 20 includes the clamping large-diameter portion 20d provided on the opposite end side of the main body portion 20c in the axial direction, and formed so as to have a larger outer diameter than the outer diameter of the main body portion 20c, and the opposite end side clamping portion 20k disposed at the clamping large-diameter portion 20d, formed into an arcuate shape that substantially matches the virtual circle centered at the first reference axis L1 within a predetermined range other than the region where the flat surface portion 20b is formed in the circumferential direction, and provided for clamping the nut 20 to the mechanical processing tool.

The flat surface portion 20b is formed so as to extend to the region where the opposite end side clamping portion 20k is formed in the axial direction. The ball circulation groove opposite end side opening 20f is formed so as to be at least partially opened to the flat surface portion 20b in the region where the opposite end side clamping portion 20k is formed in the range of the nut 20 in the axial direction.

The opposite end side clamping portion 20k is formed into an arcuate shape that substantially match the virtual circle centered at the first reference axis L1, whereby the nut 20 can be clamped to the mechanical processing tool with the first reference axis L1 set as the rotational axis. Further, the ball circulation groove opposite end side opening 20f is opened in the region of the flat plane portion 20b where the opposite end side clamping portion 20k is formed, whereby the ball circulation groove 12 can be formed so as to extend to the region where the opposite end side clamping portion 20k is formed so that the length of the nut 20 in the axial direction can be reduced. Further, the ball circulation groove opposite end side opening 20f is formed on the flat surface portion 20b, which can facilitate the process for forming the ball circulation groove opposite end side opening 20f and the process for mounting the circulation groove 23.

(5) The output pulley attachment portion 20a is formed into an arcuate shape that substantially matches the virtual circle centered at the first reference axis 11 within the predetermined range other than the region where the flat surface portion 20b is formed in the circumferential direction, and includes the one end side clamping portion 20l for clamping the nut 20 to the mechanical processing tool.

The opposite end side clamping portion 20k and the one end side clamping portion 20l serve as a pair of clamping portions having a same central axis, thereby facilitating the clamping process.

(6) The nut 20 includes the groove 20j formed on the opposite side of the first reference axis L1 from the flat surface portion 20b in the radial direction, and configured to be used to position the nut 20 when clamping the nut 20 to the mechanical processing tool.

The provision of the positioning groove 20j can improve the accuracy of positioning the nut 20 when clamping the nut 20 to the mechanical processing tool.

Second Embodiment

According to a second embodiment, at least a part 20g1 of a one end side female screw portion 20g and at least a part 20h1 of an opposite end side female screw portion 20h of the nut 20 are located so as not to interfere with the nut-side ball screw groove 21. The features similar to the first embodiment will not be described repeatedly.

Locations of Screw Portions on Flat Surface Portion

Figure 20:
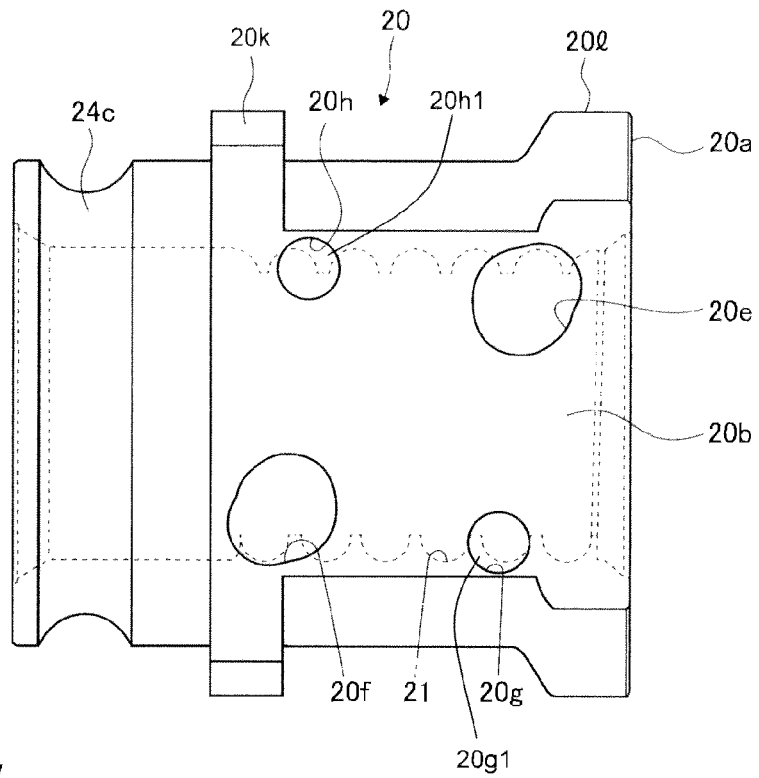
FIG. 20 is a side view of a nut according to a second embodiment as viewed from the radial direction.

FIG. 20 is a side view of the nut 20 as viewed from the radial direction. The one end side female screw portion 20g is formed at a position on the flat surface portion 20b closer to the opposite end side in the axial direction relative to the ball circulation groove one end side opening 20e, compared to the first embodiment (refer to FIG. 14). Further, the one end side female screw portion 20g is formed at a position where at least a part 20g1 of the one end side female screw portion 20g does not overlap the nut-side ball screw groove 21 in an axial direction perpendicular to the first reference axis L1 and in parallel with the flat surface portion 20b or as viewed in FIG. 20.

In other words, the one end side female screw portion 20g is located closer to the opposite end side in the axial direction to such a degree that the one end side female screw portion 20g overlaps the nut-side ball screw groove 21 in the axial direction, so that the size of the nut 20 in the axial direction can be reduced. Further, the one end side female screw portion 20g is positioned in such a manner that at least part 20g1 of the one end side female screw portion 20g does not overlap the nut-side back screw groove 21 in the vertical direction in the paper of FIG. 20 (so as to be located on a lower side relative to the nut-side ball screw groove 21 indicated by a broken line in FIG. 20), in order to prevent interference between the one end side female screw portion 20g and the nut-side ball screw groove 21.

This arrangement can reduce a risk of interference between the one end side female screw portion 20g and the nut-side ball screw groove 21, compared to forming the one end side female screw portion 20g in such a manner that the one end side female screw portion 20g completely overlaps the nut-side ball screw groove 21.

Further, the opposite end side female screw portion 20h is formed at a position on the flat surface portion 20b closer to the one end side in the axial direction relative to the ball circulation groove opposite end side opening 20f, compared to the first embodiment (refer to FIG. 14).

Further, the opposite end side female screw portion 20h is formed at a position where at least a part 20h1 of the opposite end side female screw portion 20h does not overlap the nut-side ball screw groove 21 in an axial direction perpendicular to the first reference axis L1 and in parallel with the flat surface portion 20b (so as to be located on an upper side relative to the nut-side ball screw groove 21 indicated by the broken line in FIG. 20).

In FIG. 20, the one end side female screw portion 20g and the opposite end side female screw portion 20h appear as if they are partially located in the region that overlaps the nut-side ball screw groove 21. However, assuming that the nut 20 is cut along a plane parallel with the flat surface portion 20b, the width occupied by the nut-side ball screw groove 21 is reducing as the plane is located farther away from the rotational axis. Therefore, the tips of the one end side female screw portion 20g and the opposite end side female screw portion 20h do not interfere with the nut-side ball screw groove 21.

Function

According to the second embodiment, the one end side female screw portion 20g and the opposite end side female screw portion 20h are formed at least partially outside the region that overlaps the nut-side ball screw groove 21 in the axial direction perpendicular to the first reference axis L1 and in parallel with the flat surface portion 20b or as viewed in FIG. 20. Therefore, the one end side female screw portion 20g and the opposite end side female screw portion 20h can be prevented from interfering with the nut-side ball screw groove 21.

Further, according to the second embodiment, the one end side female screw portion 20g is formed at a position on the flat surface portion 20b closer to the opposite end side in the axial direction relative to the ball circulation groove one end side opening 20e, and the opposite end side female screw portion 20h is formed at a position on the flat surface portion 20b closer to the one end side in the axial direction relative to the ball circulation groove opposite end side opening 20f. Therefore, the length of the nut in the axial direction can be reduced.

Advantageous Effect

The second embodiment provides the following advantageous effect.

(7) The opposite end side female screw portion 20h is located at a position on the flat surface portion 20b closer to the opposite end side in the axial direction relative to the ball circulation groove one end side opening 20e, at least partially outside the region that overlaps the nut-side ball screw groove 21 in the axial direction perpendicular to the first reference axis L1 and in parallel with the flat surface portion 20b.

The one end side female screw portion 20g and the opposite end side female screw portion 20h can be prevented from interfering with the nut-side ball screw groove 21. Further, the length of the nut 20 in the axial direction can be reduced.

Third Embodiment

According to a third embodiment, the circulation member 23 is fixed to the nut 20 by the inner circumferential surface of the output pulley 27. The features similar to the first embodiment will not be described repeatedly.

Fixation of Circulation Member

Figure 21:
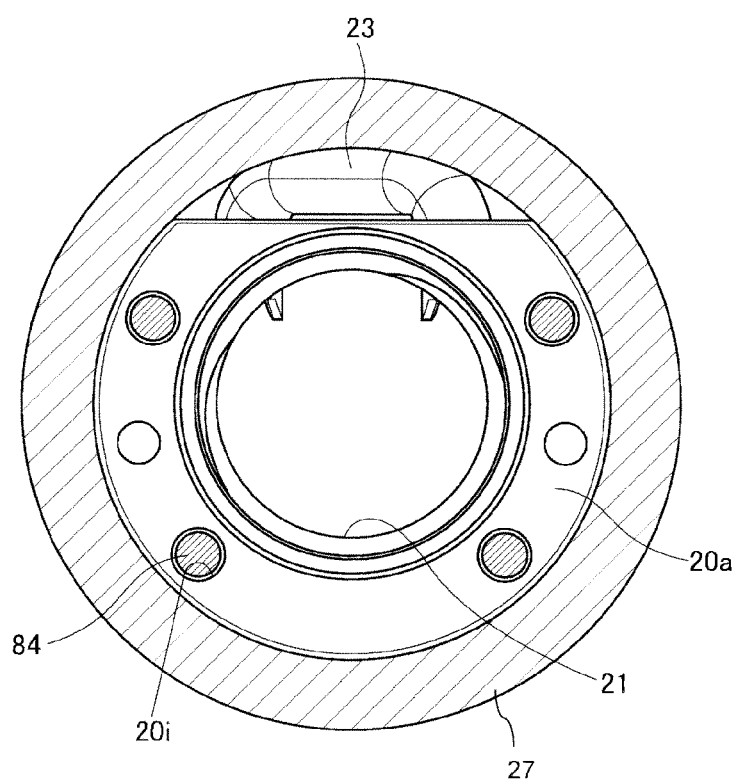
FIG. 21 is a partial cross-sectional view of a nut with the output pulley attached thereto according to a third embodiment.

FIG. 21 is a cross-sectional view of the output pulley 27 attached to the nut 20 taken along the radial direction. The third embodiment is configured in such a manner that the circulation member 23 is in abutment with the inner circumferential surface of the output pulley 27 with the output pulley 27 attached to the nut 20.

Function

The circulation member 23 is in abutment with the inner circumferential surface of the output pulley 27, whereby the circulation member 23 is not detached from the ball circulation groove one end side opening 20e and the ball circulation groove opposite end side opening 20f. Therefore, the circulation member 23 can be fixed to the nut 20 without providing an additional member.

Advantageous Effect

The third embodiment provides the following advantageous effect.

(8) The output pulley 27 is formed so as to overlap the circulation member 23 in the axial direction and surround the nut 20, and the circulation member 23 is configured to be fixed to the nut 20 by abutting against the inner circumferential surface of the output pulley 27.

Therefore, the circulation member 23 can be fixed to the nut 20 without providing an additional member.

Fourth Embodiment

According to a fourth embodiment, one end side of the fixation metal 83 for fixing the circulation member 23 to the nut 20 is engaged with an engagement target portion 20m to be engaged being formed at the nut 20. The features similar to the first embodiment will not be described repeatedly.

Structure of Fixation Metal

Figure 22:
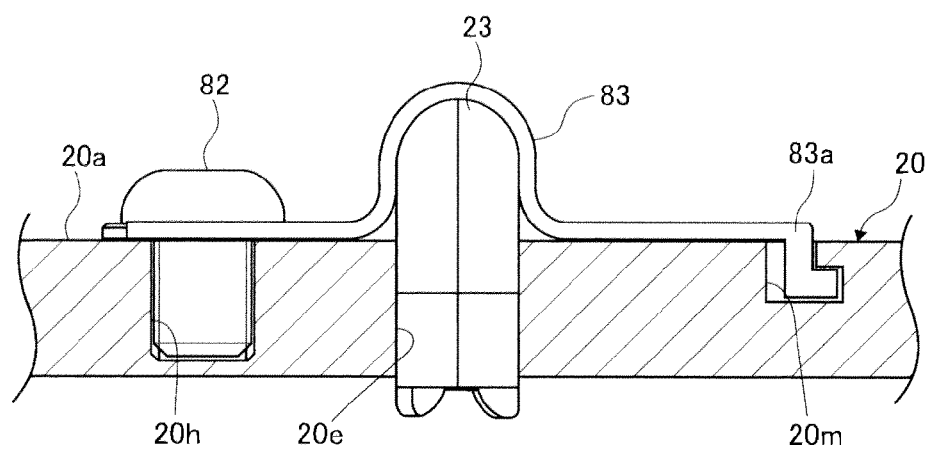
FIG. 22 is a partial cross-sectional view of a nut according to a fourth embodiment.

FIG. 22 is a partial cross-sectional view of the nut 20. One of the both ends of the fixation metal 83 that is located at the opposite end side of the nut 20 in the axial direction is fixed by the screw 82 threadably engaged with the opposite end side female screw portion 20h formed at the nut 20. An engagement portion 83a is formed so as to have a cross-section bent into an L shape at the end of the fixation metal 83 that is located at the one end side of the nut 20 in the axial direction. The engagement target portion or engaged portion 20m is formed so as to have a cross-section concaved into an L shape on the surface of the flat surface portion 20b on the one end side of the nut 20. The engagement portion 83a is engaged with the engagement target portion 20m.

Function

The engagement target portion 20m only has to be formed so as to allow the engagement portion 83 to be hooked therein, and therefore can be formed more shallowly than forming the female screw portion threadably engaged with the screw 82. Therefore, the interference with the ball circulation groove 12 does not have to be taken into consideration, whereby the engagement target portion 20m can be formed closer to the opposite end of the nut 20 in the axial direction so that the length of the nut 20 in the axial direction can be reduced.

Advantageous Effect

The fourth embodiment provides the following effect.

(9) The power steering apparatus comprises the fixation member 83 configured to fix the circulation member 23 to the nut 20. The fixation member 83 is formed so as to extend over the circulation member 23. The one of the both ends of the fixation member 83 that is located on the opposite end side in the axial direction is fixed by the screw 82 threadably engaged with the female screw formed at the nut, and the other of the both ends of the fixation member 83 that is located at the one end side in the axial direction includes the engagement portion 83a that is engaged with the engagement target portion 20m formed at the nut 20.

The engagement target portion 20m only has to be formed so as to allow the engagement portion 83 to be hooked therein, and therefore can be formed more shallowly than forming the female screw portion threadably engaged with the screw 82. Therefore, the interference between the engagement target portion 20m and the ball circulation groove 12 does not have to be taken into consideration, whereby the engagement target portion 20m can be formed closer to the opposite end of the nut 20 in the axial direction so that the length of the nut 20 in the axial direction can be reduced.

Fifth Embodiment

According to a fifth embodiment, a mass adjustment portion 20p for adjusting a rotational balance of the nut 20 (a mass balance in the circumferential direction) is formed at the output pulley attachment portion 20a of the nut 20. The features similar to the first embodiment will not be described repeatedly.

Structure of Output Pulley Attachment Portion

Figure 23:
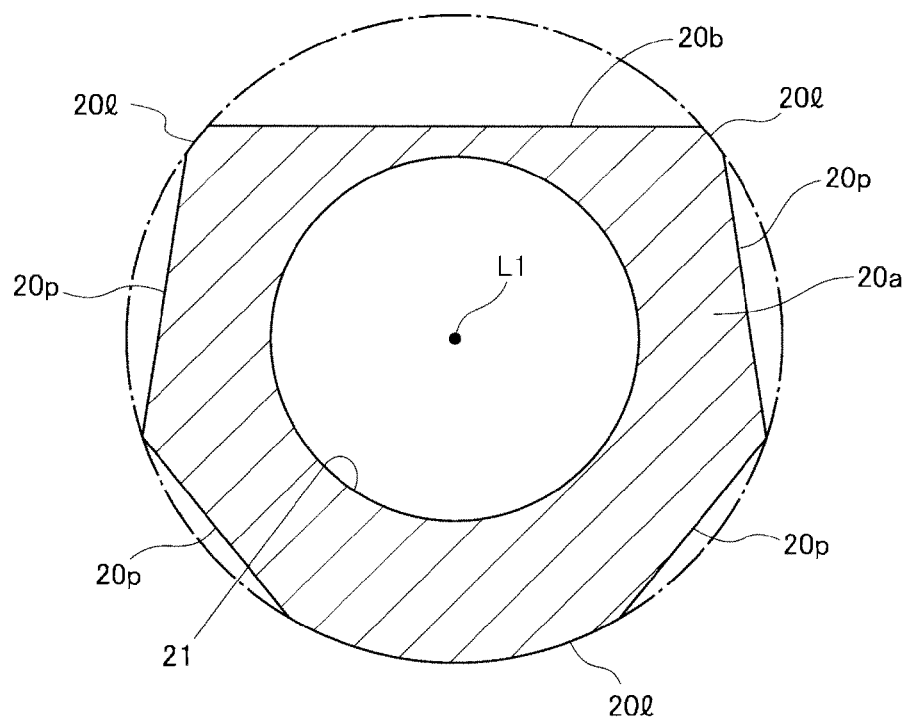
FIG. 23 is a cross-sectional view of an output pulley attachment portion according to a fifth embodiment taken along a radial direction.

FIG. 23 is a diametrical cross-sectional view of the output pulley attachment portion 20a. The output pulley attachment portion 20a includes the one end side clamping portion 20l formed into an arcuate shape that substantially matches the virtual circle centered at the first reference axis L1 in the predetermined range in the circumferential direction. Further, the mass adjustment portion 20p is formed at the output pulley attachment portion 20a by cutting out a part of the arcuate shape to equalize the mass balance of the nut 20 in the circumferential direction. The mass adjustment portion 20p is formed so as to equalize the mass balance in the circumferential direction with the bolts 84 threadably engaged with the bolt holes 20i.

Function

The flat surface portion 20b is formed at the nut 20, whereby the mass of the nut 20 is small on an upper side from the first reference axis L1 closer to the flat surface portion 20b. Therefore, especially, the mass adjustment portion 20p having a diameter smaller than the virtual circle is formed on an opposite side of the first reference axis L1 from the flat surface portion 20b, thereby improving the rotational balance of the nut 20. The improvement of the rotational balance here means improvement compared to the nut 20 that does not have the mass adjustment portion 20p.

Further, the mass adjustment portion 20p is formed so as to equalize the mass balance in the circumferential direction with the bolts 84 attached to the nut 20. Therefore, the rotational balance of the whole nut 20 can be improved with the nut 20 and the output pulley 27 attached to each other.

Advantageous Effect

The fifth embodiment provides the following advantageous effects.

(10) The output pulley attachment portion 20a includes the one end side clamping portion 20l for clamping the nut that is formed into an arcuate shape that substantially matches the virtual circle centered at the first reference axis L1 in the predetermined range other than the region where the flat surface portion 20a is formed in the circumferential direction, and the mass adjustment portion 20p provided on the opposite side of the first reference axis L1 from the flat surface portion 20b in the radial direction and having a smaller radius than the virtual circle.

The mass adjustment portion 20p having a smaller radius then the virtual circle is formed on the opposite side of the first reference axis L1 from the flat surface portion 20b, thereby improving the rotational balance of the nut 20. (11) The output pulley attachment portion 20a and the output pulley 27 are connected to each other via the bolts 84. The output pulley attachment portion 20a includes the bolt holes 20i that is threadably engaged with the bolts 84. The mass adjustment portion 20p is formed at the output pulley attachment portion 20a so as to equalize the mass balance in the circumferential direction with the bolts 84 threadably engaged with the bolt holes 20i, compared to the output pulley attachment portion 20a formed into an arcuate shape that substantially matches the virtual circle centered at the first reference axis L1 over the whole region other than the region where the flat surface portion 20b is formed in the circumferential direction.

The rotational balance of the whole nut 20 can be improved with the nut 20 and the output pulley 27 attached to each other.

Sixth Embodiment

According to a sixth embodiment, a circulation member escape portion 20q and a female screw portion escape portion 20r are formed at the output pulley attachment portion 20a of the nut 20 so as to become a same plane continuous from the flat surface portion 20b formed at the main body portion 20c. In other words, the circulation member escape portion 20q and the female screw portion escape portion 20r are flush or coplanar with the flat surface portion 20b. The features similar to the first embodiment will not be described repeatedly.

Structure of Nut

Figure 24:
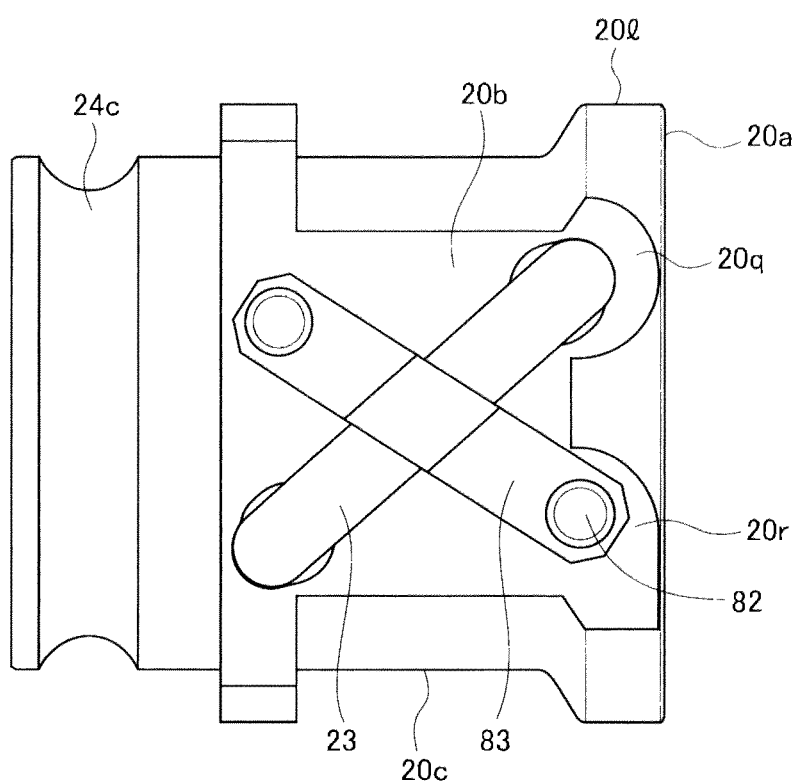
FIG. 24 is a side view of a nut according to a sixth embodiment.

FIG. 24 is a side view of the nut 20 as viewed from the radial direction. The circulation member escape portion 20q and the female screw portion escape portion 20r are formed in the region of the nut 20 where the output pulley attachment portion 20a is formed. The circulation member escape portion 20q is formed so as to surround the ball circulation groove one end side opening 20e. The female screw portion escape portion 20r is formed so as to surround the one end side female screw portion 20g. The circulation member escape portion 20q and the female screw portion escape portion 20r are formed so as to become a same plane continuous from the flat surface portion 20b.

Function

The circulation member escape portion 20q is formed in the region of the nut 20 where the output pulley attachment portion 20a is formed so as to become a same plane continuous from the flat surface portion 20b. The ball circulation groove one end side opening 20e is at least partially opened at this circulation member escape portion 20q. Obviously, the ball circulation groove one end side opening 20e may be wholly opened at the circulation member escape portion 20q. This facilitates the process for forming the ball circulation groove one end side opening 20e and the process for attaching the circulation member 23.

Further, the female screw portion escape portion 20r is formed in the region of the nut 20 where the output pulley attachment portion 20a is formed so as to become a same plane continuous from the flat surface portion 20b. The one end side female screw portion 20g is at least partially opened at this female screw portion escape portion 20r. Obviously, the one end side female screw portion 20g may be wholly opened at the female screw portion escape portion 20r. This allows the female screw portion escape portion 20r to be formed so as to overlap the region of the nut 20 where the output pulley attachment portion 20a is formed, so that the size of the nut 20 can be reduced.

Advantageous Effect

The sixth exemplary embodiment provides the following advantageous effects.

(12) The power steering apparatus according to the sixth embodiment comprises:

the wheel turning shaft (rack) 10 configured to turn the wheel to be steered by axially moving according to a rotation of the steering wheel;

the wheel turning shaft side ball screw groove 11 formed on the outer circumferential side of the wheel turning shaft 10, and shaped into a spiral groove;

the nut 20 having the main body portion 20c annularly formed so as to surround the wheel turning shaft 10, and provided rotatably relative to the wheel turning shaft 10;

the nut side ball screw groove 21 formed on the inner circumferential side of the nut 20, shaped into a spiral groove, and forming the ball circulation groove 12 together with the wheel turning shaft side ball screw groove 11;

the plurality of balls 22 loaded in the ball circulation groove 12;

the output pulley attachment portion 20a formed on the one end side in the axial direction relative to the main body portion 20c, assuming that the axial direction is the direction along the rotational axis of the nut 20, and formed so as to have a larger diameter than the outer diameter of the main body portion 20c;

the output pulley 27 attached to the output pulley attachment portion 20a so as to face the one end side of the nut 20 in the axial direction, and formed into a cylindrical shape so as to surround the wheel turning shaft 10;

the cylindrically formed input pulley 35 having the rotational axis located offset from the rotational axis of the nut 20 in the radial direction, in which the rotational axis of the nut 20 is defined as the first reference axis L1 and the rotational axis of the input pulley 35 is defined as the second reference axis L2;

the belt 28 (a transmission member) provided so as to extend over the output pulley 27 and the input pulley 35, and configured to transmit a rotation of the input pulley 35 to the output pulley 27;

the electric motor 40 configured to rotationally drive the nut 20 via the belt 28 and the output pulley 27 by rotationally driving the input pulley 35, and provide a steering force to the wheel turning shaft 10 through conversion of the rotation of the nut 20 into an axial motion of the wheel turning shaft 10;

the flat surface portion 20b formed on the outer side of the nut 20 in the radial direction over the predetermined range in the circumferential direction, assuming that the radial direction is the radial direction of the first reference axis L1 and the circumferential direction is the circumferential direction of the first reference axis L1, and formed in the region other than the region where the output pulley attachment portion 20a is formed in the axial direction of the nut 20 so as to extend substantially in parallel with the first reference axis L1 (or extend substantially in parallel with the direction of a line tangent to the circular shape of the nut 20 centered at the first reference axis L1);

the ball circulation groove one end side opening 20e (the ball circulation groove one end side opening)) provided in communication with the one end of the ball circulation groove 12, and formed so as to be at least partially opened to the flat surface portion 20b in the region where the output pulley attachment portion 20a is formed in the range of the nut in the axial direction;

the ball circulation groove opposite end side opening 20f (the ball circulation groove opposite end side opening) provided in communication with the opposite end of the ball circulation groove 12, and formed so as to be opened to the flat surface portion 20b;

the circulation member escape portion 20q provided so as to surround the ball circulation groove one end side opening 20e in the region where the output pulley attachment portion 20a is formed in the axial direction on the outer side of the nut 20 in the radial direction, and formed so as to become a same plane continuous from the flat surface portion 20b; and the circulation member 23 connecting the one end side and the opposite end side of the ball circulation groove 12 so that the plurality of balls 22 can circulate from the one end side to the opposite end side of the ball circulation groove 12 or the opposite end side from the one end side of the ball circulation groove 12.

This can facilitate the process for forming the ball circulation groove one end side opening 20e and the process for attaching the circulation member 23.

(13) The above-described power steering apparatus includes the fixation metal 83 (a fixation member) for fixing the circulation member 23 to the nut 20 by being coupled to the nut 20 by the screws 82. The nut 20 includes the one end side female screw portion 20g and the opposite end side female screw portion 20h (the female screw portion). The one end side female screw portion 20g and the opposite end side female screw portion 20h include the female screws that are threadably engaged with the screws 82. The one end side female screw portion 20g is formed so as to be at least partially opened in the region of the nut 20 where the output pulley attachment portion 20a is formed in the axial direction.

The nut 20 further includes the female screw portion escape portion 20r provided so as to surround the one end side female screw portion 20g in the region of the nut 20 where the output pulley attachment portion 20a is formed in the axial direction on the outer side of the nut 20 in the radial direction, and formed so as to become a same plane continuous from the flat surface portion 20b.

The female screw portion escape portion 20r can be formed so as to overlap the region of the nut 20 where the output pulley attachment portion 20a is formed, so that the size of the nut 20 can be reduced.

One aspect of the present invention is the power steering apparatus comprising:

the wheel turning shaft (rack) 10 configured to turn the wheel to be steered by axially moving according to a rotation of the steering wheel;

the wheel turning shaft side ball screw groove 11 formed on the outer circumferential side of the wheel turning shaft 10, and shaped into a spiral groove;

the nut 20 having the main body portion 20c annularly formed so as to surround the wheel turning shaft, and provided rotatably relative to the wheel turning shaft;

the nut side ball screw groove 21 formed on the inner circumferential side of the nut, shaped into a spiral groove, and forming the ball circulation groove together with the wheel turning shaft side ball screw groove;

the plurality of balls 22 loaded in the ball circulation groove;

the output pulley attachment portion 20a formed on the one end side in the axial direction relative to the main body portion, assuming that the axial direction is the direction along the rotational axis of the nut, and formed so as to have a larger diameter than the outer diameter of the main body portion;

the output pulley 27 attached to the output pulley attachment portion so as to face the one end side of the nut in the axial direction, and formed into a cylindrical shape so as to surround the wheel turning shaft;

the cylindrically formed input pulley 35 located offset from the rotational axis of the nut in the radial direction, in which the rotational axis of the nut 20 is defined as the first reference axis and the rotational axis of the input pulley 35 is defined as the second reference axis;

the transmission member 28 provided so as to extend over the output pulley and the input pulley, and configured to transmit a rotation of the input pulley to the output pulley;

the electric motor 40 configured to rotationally drive the nut via the transmission member and the output pulley by rotationally driving the input pulley, and provide a steering force to the wheel turning shaft through conversion of the rotation of the nut into an axial motion of the wheel turning shaft;

the flat surface portion 20b formed on the outer side of the nut in the radial direction over the predetermined range in the circumferential direction, assuming that the radial direction is the radial direction of the first reference axis L1 and the circumferential direction is the circumferential direction of the first reference axis L1, and formed so as to extend to the region where the output pulley attachment portion is formed in the axial direction and extend substantially in parallel with the first reference axis L1;

the ball circulation groove one end side opening 20e (a ball circulation groove one end side opening) provided in communication with the one end of the ball circulation groove, and formed so as to be at least partially opened to the flat surface portion in the region where the output pulley attachment portion is formed in the range of the nut in the axial direction;

the ball circulation groove opposite end side opening 20f provided in communication with the opposite end of the ball circulation groove, and formed so as to be opened to the flat surface portion; and the circulation member 23 connecting the one end side and the opposite end side of the ball circulation groove so that the plurality of balls can circulate from the one end side to the opposite end side of the ball circulation groove or the opposite end side from the one end side of the ball circulation groove.

The output pulley attachment portion having a large diameter is formed at the one end side of the nut in the axial direction, thereby securing the region for the attachment of the output pulley to the nut. Further, the ball circulation groove one end side opening is formed in the range of the nut where the output pulley attachment portion is formed in the axial direction, whereby the circulation member can be disposed so as to overlap the range where the output pulley attachment portion is formed in the axial direction so that the size of the apparatus in the axial direction can be reduced. Further, the flat surface portion is formed so as to extend to the output pulley attachment portion where the ball circulation groove one end side opening is opened, which facilitates the process for forming the ball circulation groove one end side opening or the process for attaching the circulation member.

The above-described power steering apparatus may further comprise the fixation member 83 configured to fix the circulation member 23 to the nut 20 by being coupled to the nut 20 by the screws 82.

The nut may include the female screw portions 20g and 20h formed so as to be opened to the flat surface portion 20b and including the female screws configured to be threadably engaged with the screws.

The female screw portion 20g may be at least partially formed in the region on the flat surface portion where the output pulley attachment portion is formed in the range of the nut 20 in the axial direction.

Forming the female screw portion so as to overlap the range where the output pulley attachment portion is formed in the axial direction can further reduce the size of the apparatus in the axial direction.

In the above-described power steering apparatus, the female screw portion 20g may be located at a position on the flat surface portion 20b closer to the opposite end side in the axial direction relative to the ball circulation groove one end side opening 20e, and the female screw portion 20g may be formed at a position where at least a part of the female screw portion 20g does not overlap the nut-side ball screw groove 21 in the axial direction perpendicular to the first reference axis L1 and in parallel with the flat surface portion 20b.

Forming the female screw portion within the range where the ball circulation groove is formed in the axial direction may lead to interference between the female screw portion and the ball circulation groove. Therefore, forming the female screw portion in such a manner that at least a part of the female screw portion is located outside the range where the ball circulation groove is formed can prevent the interference therebetween. Further, positioning the female screw portion closer to the opposite end side in the axial direction relative to the ball circulation groove one end side opening can further reduce the size of the apparatus in the axial direction.

In the above-described power steering apparatus, the head portion of the screw may have a substantially semispherical shape.

The screw having the substantially semispherical head portion can prevent interference between the output pulley and the head portion of the screw when the output pulley has a cup-like shape surrounding the nut.

In the above-described power steering apparatus, the nut may include the clamping large-diameter portion 20d provided on the opposite end side of the main body portion in the axial direction and formed so as to have a larger diameter than the outer diameter of the main body portion, and the opposite end side clamping portion 20k formed at the clamping large-diameter portion so as to have an arcuate shape that substantially matches the virtual circle centered at the first reference axis in the predetermined range other than the region where the flat surface portion is formed in the circumferential direction, and configured to be used to clamp the nut.

The flat surface portion may be formed so as to extend to the region where the opposite end side clamping large-diameter portion is formed in the axial direction, and the ball circulation groove opposite end side opening 20f may be formed so as to be at least partially opened to the flat surface portion in the region where the opposite end side clamping large-diameter portion 20k is formed in the range of the nut in the axial direction.

Forming the clamping large-diameter portion having the clamping portion at the nut allows the nut to be clamped to the mechanical processing tool with the rotational axis of the nut set as the reference axis. Further, the size of the apparatus can be further reduced by forming the flat surface portion so as to extend to the region corresponding to the clamping large-diameter portion and positioning the ball circulation groove opposite end opening 20f in the region corresponding to this clamping large-diameter portion.

In the above-described power steering apparatus, the output pulley attachment portion may include the one end side clamping portion formed into an arcuate shape that substantially matches the virtual circle centered at the first reference axis in the predetermined range other than the region where the flat surface portion is formed in the circumferential direction, and configured to be used to clamp the nut.

Using a same virtual circle as the virtual circles for the one end side clamping portion and the opposite end side clamping portion allows them to serve as a pair of clamping portions having a same central axis and a same radius, thereby facilitating the clamping process.

In the above-described power steering apparatus, the output pulley may be formed so as to overlap the circulation member in the axial direction and surround the nut.

The circulation member may be in abutment with the inner circumferential surface of the output pulley, thereby being fixed to the nut.

The circulation member can be fixed without additionally providing a fixation member.

The above-described power steering apparatus may further comprise the fixation member configured to fix the circulation member to the nut.

The fixation member may be formed so as to extend over the circulation member. The one of the both ends of the fixation member that is located on the opposite end side in the axial direction may be fixed by the screw threadably engaged with the female screw formed at the nut. The other of the both ends of the fixation member that is located on the one end side in the axial direction may include the engagement portion configured to be engaged with the recess formed at the nut.

In this case, the end of the fixation member on the one side in the axial direction is engaged by the recess instead of the screw fixation, whereby it becomes unnecessary to consider the interference between the female screw and the ball circulation groove which would otherwise have to be considered if a female screw is formed on the one end side in the axial direction. Therefore, the portion where the fixation member is fixed on the one side in the axial direction can be located closer to the opposite end side in the axial direction so that the size of the apparatus in the axial direction can be further reduced.

In the above-described power steering apparatus, the output pulley attachment portion may include the one end side clamping portion formed into an arcuate shape that substantially matches the virtual circle centered at the first reference axis in the predetermined range other than the region where the flat surface portion is formed in the circumferential direction, and configured to be used to clamp the nut, and the mass adjustment portion provided on the opposite side of the first reference axis from the flat surface portion in the radial direction and having a smaller radius than the virtual circle.

The nut, which rotates around the first reference axis as the rotational axis, has a smaller mass at the flat surface portion. Therefore, the provision of the mass adjustment portion on the opposite side therefrom in the radial direction can improve the rotational balance of the nut. The improvement of the rotational balance means improvement compared to the nut does not have the mass adjustment portion.

In the above-described power steering apparatus, the output pulley attachment portion and the output pulley may be connected to each other via the bolts.

The output pulley attachment portion may include the female screw portions configured to be threadably engaged with the bolts.

The mass adjustment portion may be formed so as to equalize the mass balance in the circumferential direction with the bolts threadably engaged with the female screw portions, compared to the nut having the output pulley attachment portion formed into an arcuate shape that substantially matches the virtual circle centered at the first reference axis in the whole region other than the region where the flat surface portion is formed in the circumferential direction.

The rotational balance can be improved in consideration of the masses of the bolts, whereby the rotational balance can be improved in a state further closer to an actual rotator.

In the above-described power steering apparatus, the nut may include the groove positioned on the opposite side of the first reference axis from the flat surface portion in the radial direction, and configured to be used to position the nut when clamping the nut.

The accuracy for positioning the nut can be improved.

Another aspect of the present invention is the power steering apparatus comprising:

the wheel turning shaft (rack) 10 configured to turn the wheel to be steered by axially moving according to a rotation of the steering wheel;

the wheel turning shaft side ball screw groove 11 formed on the outer circumferential side of the wheel turning shaft 10, and shaped into a spiral groove;

the nut 20 having the main body portion 20c annularly formed so as to surround the wheel turning shaft, and provided rotatably relative to the wheel turning shaft;

the nut side ball screw groove 21 formed on the inner circumferential side of the nut 20, shaped into a spiral groove, and forming the ball circulation groove together with the wheel turning shaft side ball screw groove;

the plurality of balls 22 loaded in the ball circulation groove;

the output pulley attachment portion 20a formed on the one end side in the axial direction relative to the main body portion, assuming that the axial direction is the direction along the rotational axis of the nut 20, and formed so as to have a larger diameter than the outer diameter of the main body portion 20c;

the output pulley 27 attached to the output pulley attachment portion so as to face the one end side of the nut in the axial direction, and formed into a cylindrical shape so as to surround the wheel turning shaft;

the cylindrically formed input pulley 35 having the rotational axis located offset from the rotational axis of the nut in the radial direction, in which the rotational axis of the nut 20 is defined as the first reference axis and the rotational axis of the input pulley 35 is defined as the second reference axis;

the transmission member 28 provided so as to extend over the output pulley and the input pulley, and configured to transmit a rotation of the input pulley to the output pulley;

the electric motor 40 configured to rotationally drive the nut via the transmission member and the output pulley by rotationally driving the input pulley, and provide a steering force to the wheel turning shaft through conversion of the rotation of the nut into an axial motion of the wheel turning shaft;

the flat surface portion 20b formed on the outer side of the nut in the radial direction over the predetermined range in the circumferential direction, assuming that the radial direction is the radial direction of the first reference axis L1 and the circumferential direction is the circumferential direction of the first reference axis L1, and formed in the region other than the region where the output pulley attachment portion is formed in the axial direction of the nut and extend substantially in parallel with the first reference axis L1;

the ball circulation groove one end side opening 20e provided in communication with the one end of the ball circulation groove, and formed so as to be at least partially opened to the flat surface portion in the region where the output pulley attachment portion 20a is formed in the range of the nut in the axial direction;

the ball circulation groove opposite end side opening 20f provided in communication with the opposite end of the ball circulation groove, and formed so as to be opened to the flat surface portion;

the circulation member escape portion 20q provided so as to surround the ball circulation groove one end side opening in the region where the output pulley attachment portion is formed in the axial direction on the outer side of the nut in the radial direction, and formed so as to become a same plane continuous from the flat surface portion; and the circulation member 23 connecting the one end side and the opposite end side of the ball circulation groove so that the plurality of balls can circulate from the one end side to the opposite end side of the ball circulation groove or the opposite end side from the one end side of the ball circulation groove.

The output pulley attachment portion having a large diameter is formed at the one end side of the nut in the axial direction, thereby securing the region for the attachment of the output pulley to the nut. Further, the ball circulation groove one end side opening is formed in the range of the nut where the output pulley attachment portion is formed in the axial direction, whereby the circulation member can be disposed so as to overlap the range where the output pulley attachment portion is formed in the axial direction so that the size of the apparatus in the axial direction can be reduced. Further, the circulation member escape portion is formed at the output pulley attachment portion where the ball circulation groove one end side opening is opened, which facilitates the process for forming the ball circulation groove one end side opening or the process for attaching the circulation member.

The above-described power steering apparatus may further comprise the fixation member 83 configured to fix the circulation member 23 to the nut 20 by being coupled to the nut 20 by the screws 82.

The nut may include the female screw portion 20g formed so as to be at least partially opened in the region where the output pulley attachment portion 20a is formed in the axial direction, and including the female screw configured to be threadably engaged with the screw, and the female screw escape portion 20r provided on the outer side of the nut in the radial direction in the region where the output pulley attachment portion 20a is formed in the axial direction so as to surround the female screw portion 20g, and formed so as to become a same plane continuously from the flat surface portion 20b.

Forming the female screw portion so as to overlap the range where the output pulley attachment portion is formed in the axial direction can further reduce the size of the apparatus in the axial direction.

In the above-described power steering apparatus, the female screw portion 20g may be located at a position on the flat surface portion 20b closer to the opposite end side in the axial direction relative to the ball circulation groove one end side opening 20e, and the female screw portion 20g may be formed at a position where at least a part of the female screw portion 20g does not overlap the nut-side ball screw groove 21 in the axial direction perpendicular to the first reference axis L1 and in parallel with the flat surface portion 20b.

Forming the female screw portion within the range where the ball circulation groove is formed in the axial direction may lead to interference between the female screw portion and the ball circulation groove. Therefore, forming the female screw portion in such a manner that at least a part of the female screw portion is located outside the range where the ball circulation groove is formed can prevent the interference therebetween. Further, positioning the female screw portion closer to the opposite end side in the axial direction relative to the ball circulation groove one end side opening can further reduce the size of the apparatus in the axial direction.

In the above-described power steering apparatus, the head portion of the screw may have a substantially semispherical shape.

The screw having the substantially semispherical head portion can prevent interference between the output pulley and the head portion of the screw when the output pulley has a cup-like shape surrounding the nut.

In the above-described power steering apparatus, the output pulley may be formed so as to overlap the circulation member in the axial direction and surround the nut.

The circulation member may be in abutment with the inner circumferential surface of the output pulley, thereby being fixed to the nut.

The circulation member can be fixed without additionally providing a fixation member.

The above-described power steering apparatus may further comprise the fixation member configured to fix the circulation member to the nut.

The fixation member may be formed so as to extend over the circulation member. The one of the both ends of the fixation member that is located on the opposite end side in the axial direction may be fixed by the screw threadably engaged with the female screw formed at the nut. The other of the both ends of the fixation member that is located on the one end side in the axial direction may include the engagement portion configured to be engaged with the recess formed at the nut.

In this case, the end of the fixation member on the one side in the axial direction is engaged by the recess instead of the screw fixation, whereby it becomes unnecessary to consider the interference between the female screw and the ball circulation groove which would otherwise have to be considered if a female screw is formed on the one end side in the axial direction. Therefore, the portion where the fixation member is fixed on the one side in the axial direction can be located closer to the opposite end side in the axial direction so that the size of the apparatus in the axial direction can be further reduced.

In the above-described power steering apparatus, the nut may include the groove positioned on the opposite side of the first reference axis from the flat surface portion in the radial direction, and configured to be used to position the nut when clamping the nut.

The accuracy for positioning the nut can be improved.

Having described the present invention based on the first to sixth embodiments, the specific configurations of the aspects of the present invention are not limited to the first to sixth embodiments, and can be modified or the like within the scope of the present invention. These modifications or the like are also included in the present invention.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2013-061961 filed on Mar. 25, 2013.

The entire disclosure of Japanese Patent Application No. 2013-061961 filed on Mar. 25, 2013 including specification, claims, drawings and summary are incorporated herein by reference in its entirety.

What is claimed is:
1. A power steering apparatus comprising:
a wheel turning shaft configured to turn a wheel to be steered by axially moving according to a rotation of a steering wheel;
a wheel turning shaft side ball screw groove formed on an outer circumferential side of the wheel turning shaft, and shaped into a spiral groove;
a nut having a main body portion annularly formed so as to surround the wheel turning shaft, and provided rotatably relative to the wheel turning shaft;
a nut side ball screw groove formed on an inner circumferential side of the nut, shaped into a spiral groove, and forming a ball circulation groove together with the wheel turning shaft side ball screw groove;
a plurality of balls loaded in the ball circulation groove;
an output pulley attachment portion formed on one end side in an axial direction relative to the main body portion, assuming that the axial direction is a direction along a rotational axis of the nut, and formed so as to have a larger diameter than an outer diameter of the main body portion;
an output pulley attached to the output pulley attachment portion so as to face the one end side of the nut in the axial direction, and formed into a cylindrical shape so as to surround the wheel turning shaft;
a cylindrically formed input pulley located offset from the rotational axis of the nut in a radial direction, in which the rotational axis of the nut is defined as a first reference axis and a rotational axis of the input pulley is defined as a second reference axis;

a transmission member provided so as to extend over the output pulley and the input pulley, and configured to transmit a rotation of the input pulley to the output pulley;

an electric motor configured to rotationally drive the nut via the transmission member and the output pulley by rotationally driving the input pulley, and provide a steering force to the wheel turning shaft through conversion of the rotation of the nut into an axial motion of the wheel turning shaft;

a flat surface portion formed on an outer side of the nut in the radial direction over a predetermined range in a circumferential direction, assuming that the radial direction is a radial direction of the first reference axis and the circumferential direction is a circumferential direction of the first reference axis, and formed so as to extend to a region where the output pulley attachment portion is formed in the axial direction and extend substantially in parallel with the first reference axis;

a ball circulation groove one end side opening provided in communication with one end of the ball circulation groove, and formed so as to be at least partially opened to the flat surface portion in the region where the output pulley attachment portion is formed in a range of the nut in the axial direction;

a ball circulation groove opposite end side opening provided in communication with an opposite end of the ball circulation groove, and formed so as to be opened to the flat surface portion; and a circulation member connecting the one end and the opposite end of the ball circulation groove so that the plurality of balls can circulate from the one end to the opposite end of the ball circulation groove or the opposite end from the one end of the ball circulation groove.

2. The power steering apparatus according to claim 1, further comprising a fixation member configured to fix the circulation member to the nut by being coupled to the nut by a screw, wherein the nut includes a female screw portion formed so as to be opened to the flat surface portion and including a female screw configured to be threadably engaged with the screw, and wherein the female screw portion is at least partially formed in a region on the flat surface portion where the output pulley attachment portion is formed in the range of the nut in the axial direction.

3. The power steering apparatus according to claim 2, wherein the female screw portion is located at a position on the flat surface portion closer to an opposite end side in the axial direction relative to the ball circulation groove one end side opening, and the female screw portion is formed at a position where at least a part of the female screw portion does not overlap the nut-side ball screw groove in an axial direction perpendicular to the first reference axis and in parallel with the flat surface portion.

4. The power steering apparatus according to claim 3, wherein a head portion of the screw has a substantially semispherical shape.

5. The power steering apparatus according to claim 2, wherein the nut includes a clamping large-diameter portion provided on an opposite end side of the main body portion in the axial direction and formed so as to have a larger diameter than the outer diameter of the main body portion, and an opposite end side clamping portion formed at the clamping large-diameter portion so as to have an arcuate shape that substantially matches a virtual circle centered at the first reference axis in a predetermined range other than a region where the flat surface portion is formed in the circumferential direction, and configured to be used to clamp the nut, wherein the flat surface portion is formed so as to extend to a region where the opposite end side clamping large-diameter portion is formed in the axial direction, and wherein the ball circulation groove opposite end side opening is formed so as to be at least partially opened to the flat surface portion in the region where the opposite end side clamping large-diameter portion is formed in the range of the nut in the axial direction.

6. The power steering apparatus according to claim 5, wherein the output pulley attachment portion includes a one end side clamping portion formed into an arcuate shape that substantially matches the virtual circle centered at the first reference axis in a predetermined range other than the region where the flat surface portion is formed in the circumferential direction, and configured to be used to clamp the nut.

7. The power steering apparatus according to claim 1, wherein the output pulley is formed so as to overlap the circulation member in the axial direction and surround the nut, and wherein the circulation member is in abutment with an inner circumferential surface of the output pulley, thereby being fixed to the nut.

8. The power steering apparatus according to claim 1, further comprising a fixation member configured to fix the circulation member to the nut, wherein the fixation member is formed so as to extend over the circulation member, and wherein one of both ends of the fixation member that is located on an opposite end side in the axial direction is fixed by a screw threadably engaged with a female screw formed at the nut, and the other of the both ends of the fixation member that is located on the one end side in the axial direction includes an engagement portion configured to be engaged with a recess formed at the nut.

9. The power steering apparatus according to claim 1, wherein the output pulley attachment portion includes a one end side clamping portion formed into an arcuate shape that substantially matches a virtual circle centered at the first reference axis in a predetermined range other than a region where the flat surface portion is formed in the circumferential direction, and configured to be used to clamp the nut, and a mass adjustment portion provided on an opposite side of the first reference axis from the flat surface portion in the radial direction and having a smaller radius than the virtual circle.

10. The power steering apparatus according to claim 9, wherein the output pulley attachment portion and the output pulley are connected to each other via a bolt, wherein the output pulley attachment portion includes a female screw portion configured to be threadably engaged with the bolt, and wherein the mass adjustment portion is formed so as to equalize a mass balance in the circumferential direction with the bolt threadably engaged with the female screw portion, compared to the nut having the output pulley attachment portion formed into an arcuate shape that substantially matches the virtual circle centered at the first reference axis in a whole region other than the region where the flat surface portion is formed in the circumferential direction.

11. The power steering apparatus according to claim 1, wherein the nut includes a groove positioned on an opposite side of the first reference axis from the flat surface portion in the radial direction, and configured to be used to position the nut when clamping the nut.

12. A power steering apparatus comprising:
a wheel turning shaft configured to turn a wheel to be steered by axially moving according to a rotation of a steering wheel;
a wheel turning shaft side ball screw groove formed on an outer circumferential side of the wheel turning shaft, and shaped into a spiral groove;
a nut having a main body portion annularly formed so as to surround the wheel turning shaft, and provided rotatably relative to the wheel turning shaft;
a nut side ball screw groove formed on an inner circumferential side of the nut, shaped into a spiral groove, and forming a ball circulation groove together with the wheel turning shaft side ball screw groove;
a plurality of balls loaded in the ball circulation groove;
an output pulley attachment portion formed on a one end side in an axial direction relative to the main body portion, assuming that the axial direction is a direction along a rotational axis of the nut, and formed so as to have a larger diameter than an outer diameter of the main body portion;
an output pulley attached to the output pulley attachment portion so as to face the one end side of the nut in the axial direction, and formed into a cylindrical shape so as to surround the wheel turning shaft;
a cylindrically formed input pulley having a rotational axis located offset from the rotational axis of the nut in a radial direction, in which the rotational axis of the nut is defined as a first reference axis and the rotational axis of the input pulley is defined as a second reference axis;
a transmission member provided so as to extend over the output pulley and the input pulley, and configured to transmit a rotation of the input pulley to the output pulley;
an electric motor configured to rotationally drive the nut via the transmission member and the output pulley by rotationally driving the input pulley, and provide a steering force to the wheel turning shaft through conversion of the rotation of the nut into an axial motion of the wheel turning shaft;
a flat surface portion formed on an outer side of the nut in the radial direction over a predetermined range in a circumferential direction, assuming that the radial direction is a radial direction of the first reference axis and the circumferential direction is a circumferential direction of the first reference axis, and formed in a region other than a region where the output pulley attachment portion is formed in the axial direction of the nut and extend substantially in parallel with the first reference axis;
a ball circulation groove one end side opening provided in communication with an one end of the ball circulation groove, and formed so as to be at least partially opened to the flat surface portion in the region where the output pulley attachment portion is formed in a range of the nut in the axial direction;
a ball circulation groove opposite end side opening provided in communication with an opposite end of the ball circulation groove, and formed so as to be opened to the flat surface portion;
a circulation member escape portion provided so as to surround the ball circulation groove one end side opening in the region where the output pulley attachment portion is formed in the axial direction on the outer side of the nut in the radial direction, and formed so as to become a same plane continuous from the flat surface portion; and
a circulation member connecting the one end and the opposite end of the ball circulation groove so that the plurality of balls can circulate from the one end to the opposite end of the ball circulation groove or the opposite end from the one end of the ball circulation groove.

13. The power steering apparatus according to claim 12, further comprising a fixation member configured to fix the circulation member to the nut by being coupled to the nut by a screw,
wherein the nut includes
a female screw portion formed so as to be at least partially opened in the region where the output pulley attachment portion is formed in the axial direction, and including a female screw configured to be threadably engaged with the screw, and
a female screw escape portion provided on the outer side of the nut in the radial direction in the region where the output pulley attachment portion is formed in the axial direction so as to surround the female screw portion, and formed so as to become a same plane continuously from the flat surface portion.

14. The power steering apparatus according to claim 13, wherein the female screw portion is located at a position on the flat surface portion closer to an opposite end side in the axial direction relative to the ball circulation groove one end side opening, and the female screw portion is formed at a position where at least a part of the female screw portion does not overlap the nut-side ball screw groove in the axial direction perpendicular to the first reference axis and in parallel with the flat surface portion.

15. The power steering apparatus according to claim 14, wherein a head portion of the screw has a substantially semispherical shape.

16. The power steering apparatus according to claim 12, wherein the output pulley is formed so as to overlap the circulation member in the axial direction and surround the nut, and
wherein the circulation member is in abutment with an inner circumferential surface of the output pulley, thereby being fixed to the nut.

17. The power steering apparatus according to claim 12, further comprising a fixation member configured to fix the circulation member to the nut,
wherein the fixation member is formed so as to extend over the circulation member, and
wherein one of both ends of the fixation member that is located on the opposite end side in the axial direction is fixed by a screw threadably engaged with a female screw formed at the nut, and the other of the both ends of the fixation member that is located on the one end side in the axial direction includes an engagement portion configured to be engaged with a recess formed at the nut.

18. The power steering apparatus according to claim 12, wherein the nut includes a groove positioned on an opposite side of the first reference axis from the flat surface portion in the radial direction, and configured to be used to position the nut when clamping the nut.

* * * * *